United States Patent
Edwards

(10) Patent No.: US 7,545,918 B2
(45) Date of Patent: Jun. 9, 2009

(54) CALL TICKER

(75) Inventor: Michael Edwards, Madison, MS (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1049 days.

(21) Appl. No.: 10/722,921

(22) Filed: Nov. 26, 2003

(65) Prior Publication Data

US 2005/0111644 A1   May 26, 2005

(51) Int. Cl.
*H04M 1/64* (2006.01)

(52) U.S. Cl. ............................. 379/88.22; 379/201.02; 379/207.02; 370/352

(58) Field of Classification Search ... 379/88.11–88.14, 379/88.16–88.17, 88.19–88.21, 93.17, 93.23, 379/142.01–142.02, 142.14–142.17, 245–247, 379/88.25, 88.23, 201.02, 207.02; 370/352–356; 707/10, 101, 102, 103, 104
See application file for complete search history.

(56) References Cited

U.S. PATENT DOCUMENTS

| | | | |
|---|---|---|---|
| 5,933,778 A * | 8/1999 | Buhrmann et al. ........... 455/461 |
| 6,259,772 B1 * | 7/2001 | Stephens et al. ........... 379/88.23 |
| 6,284,745 B1 * | 9/2001 | Kawashima et al. ........... 514/55 |
| 6,556,997 B1 * | 4/2003 | Levy ........................... 707/10 |
| 6,687,341 B1 * | 2/2004 | Koch et al. ................ 379/88.17 |
| 6,711,241 B1 * | 3/2004 | White et al. .............. 379/88.17 |
| 6,718,178 B1 * | 4/2004 | Sladek et al. ................ 455/466 |
| 6,950,502 B1 * | 9/2005 | Jenkins ..................... 379/88.12 |
| 7,139,376 B2 * | 11/2006 | Nabkel et al. ........... 379/201.01 |
| 7,177,404 B2 * | 2/2007 | Rosenthal ................. 379/88.17 |
| 7,181,488 B2 * | 2/2007 | Martin et al. ................ 709/200 |
| 2004/0161083 A1 * | 8/2004 | Crockett et al. ........... 379/93.23 |
| 2005/0073999 A1 * | 4/2005 | Koch ........................... 370/352 |

* cited by examiner

*Primary Examiner*—Binh K Tieu
(74) *Attorney, Agent, or Firm*—Scott P. Zimmerman, PLLC

(57) ABSTRACT

Methods, systems, and apparatuses for call ticker messaging are disclosed. In various embodiments, a Call Ticker Signal may be generated by a communications device that communicates with a communications network to activate Call Ticker Services, to create and/or access a Call Ticker Profile, to create and/or access a Call Ticker Message, and/or to communicate the Call Ticker Signal to a communications address. The Call Ticker Message and Call Ticker Signal may include text, video, voice, and/or digital data.

20 Claims, 16 Drawing Sheets

CALL TICKER

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention relates to a system and method for call ticker.

2. Description of the Related Art

Telecommunications has experienced explosive growth, and more growth is planned as telecommunication access and numerous communications devices improve. This explosive growth is revolutionizing special services offered to subscribing customers. Of the special service offerings, the most relevant to this invention is the caller identification or Caller ID services. A customer or a user of a telephone that is served by the Caller ID service is provided with a calling party's directory information. Presently available Caller ID systems provide the calling party's telephone number and a billing name associated with the calling party's telephone number (if available) when an incoming caller line identification (ICLID) signal can be detected, decoded, and transmitted to the called telephone or other display device associated with the called telephone (e.g., a Caller ID device). The Caller ID services also allow a receiving party to receive directory information for other incoming calls while the receiving party's phone is used (e.g., during a conversation with another party); this service is sometimes referred to as Caller ID Call Waiting (CIDW) service.

Typically, an incoming call triggers a ringer (or generates a tone if CIDW) of the called telephone to alert a customer that there is an incoming call. Once alerted, the customer may view displayed Caller ID information to make a decision whether to answer, to not answer, and/or to prepare for the incoming call. Thereafter, the customer may have a record of the Caller ID information stored on a Caller ID device and may use that information to return a call, to update a personal phone book, and/or to track calls. Because of limited information transmitted with the ICLID signal, limited capabilities of Caller ID devices, and/or limited notification alerts, alternate caller identification systems and methods are desired.

BRIEF SUMMARY OF THE INVENTION

This invention addresses the above and other needs by providing systems and methods for enabling and/or generating Call Ticker Messaging. Typically, an incoming calling line identification (ICLID) signal contains or is supplanted with a Call Ticker Signal that is transmitted to a destination communications address. The Call Ticker Signal includes a Call Ticker Message and may also include an identifier of the destination communications address (e.g., name of receiving party, address of the receiving party's communications device, such as the destination telephone number, and other identifiers of the destination communications address) and/or an identifier of the calling party (e.g., name of calling party, address of calling party's communications device, such as an originating telephone number, and other source identification of the incoming Call Ticker Message). In various embodiments, the Call Ticker Signal may be generated by a computer program and/or a telephone (and/or alternate communications device) that communicates with a communications network to activate Call Ticker services, to create and/or access a Call Ticker Profile, to create and/or access a Call Ticker Message, and/or to communicate the Call Ticker Signal to the destination communications address. After the Call Ticker Signal is transmitted to the destination communications address, a receiving party (e.g., receiving party, customer, user, and the like) may act on the Call Ticker Message. For example, the receiving party may review the Call Ticker Message, respond to the Call Ticker Message, forward the Call Ticker Message, store the Call Ticker Message, ignore the Call Ticker Message, and/or handle the Call Ticker Message or Call Ticker Signal according to other options.

According to embodiments of this invention, a communications system for providing call ticker services includes a call ticker application and a communications network having a call ticker dataserver. The call ticker application generates a call ticker signal that includes a Call Ticker Message and a destinations communications address. The Call Ticker Message contains selected text, voice, video, and/or electronic data for presentation by a Caller ID device and/or a receiving party's communications device of the destination communications address. Typically, the communications network detects an incoming communications signal on a communications link from a communications device (e.g., calling party's communications device, receiving party's communications device, Caller ID device, and/or administrator's communications device) to a destinations address (e.g., the phone number of the customer receiving the Call Ticker Message) or to a call ticker access address (e.g., a toll free number, a toll number, a local access telephone number, and/or a destination communications address). Once a communications link is established between the communications device and the communications network, the call ticker application interfaces with the call ticker dataserver to access (or alternatively, to save and/or to otherwise manage) a call ticker profile associated with the destination communications address. The call ticker profile may include a template for the call ticker message, an identifier for an originating communications address, an identifier of the destinations communications address, an identifier of the communications device, a call ticker service feature, and/or a call ticker default service feature. When the call ticker message is detected, decoded, and/or communicated to a Caller ID device and/or the receiving party's communications device, the Caller ID device and/or the receiving party's communications device may generate an alert (e.g., ringing, synthesized speech, visual alert, etc.) of the incoming communications signal (e.g., ICLID and/or Call Ticker Signal) with the Call Ticker Message. Alternatively, an alert of the Caller ID device and/or the receiving party's communications device may be deactivated when the incoming communications signal with the Call Ticker Message is detected, decoded, and/or communicated. The communications network may include a public switched telephone network (PSTN), a mobile switching telephone communications network (MSTO), a world wide electronic data communications network (e.g., Intranet, Internet, and Extranet), satellite communications network, and/or other networks.

According to further embodiments of this invention, a call ticker application includes a computer-readable medium and a Call Ticker Module stored on the computer-readable medium. The computer-readable medium may be a memory device. Further, the Call Ticker Module generates a call ticker signal and communicates a call ticker message of the call ticker signal. The Call Ticker Message contains selected text, voice, video, and/or electronic data for presentation by a Caller ID device and/or a receiving party's communications device of the destination communications address. For example, the Call Ticker Message may contain selected stock quotes, weather, and/or sports updates that are communicated according to a Call Ticker Profile that may include a template for the call ticker message, an identifier for an originating communications address, an identifier of the destinations communications address, an identifier of the communications device, a call ticker service feature, and/or a call ticker default service feature.

According to still further embodiments, a call ticker communications system includes a communications network that transmits and receives (also referred to as "transceives") communications signals with a calling party's communications device to generate a call ticker communications signal that includes a call ticker message, an identifier of an originating communications address, an identifier of a destinations communications address, and/or an identifier of a receiving party's communications device. Further, the communications network processes an incoming line identification (ICLID) signal of the calling party's communications device and/or the call ticker communications signal and transmits the call ticker message to the destinations communications address.

According to other embodiments, a call ticker communications method includes processing a communications signal from a calling party's communications device to a call ticker access address, associating an incoming line identification (ICLID) signal with the call ticker communications signal, associating a call ticker profile with the ICLID signal, and generating a call ticker signal using the call ticker profile and/or a call ticker instruction transmitted from the calling party's communications device. Similar to the above embodiments, the call ticker profile includes a template for a call ticker message, an identifier for an originating communications address, an identifier of the destinations communications address, an identifier of a receiving party's communications device, a call ticker service feature, and/or a call ticker default service feature. The call ticker service feature may include a billing parameter for communication of the call ticker signal over the communications network, a timing parameter that enables the call ticker signal for selected times of day and days of week, a do not disturb parameter that disables an alert of the incoming call ticker signal to the destination communications address, a priority parameter that identifies a selected importance of the call ticker signal, a call waiting parameter that communicates the call ticker signal during on on-hook state of the receiving party's communications device of the destinations communications address, a disable parameter that disables the call ticker signal for selected times of day and days of week, a block parameter to block the call ticker signal, an identification and authentication parameter to validate at least one of the call ticker signal and the originating communications address, a memory service parameter for data stored with the call ticker signal, and a configuration parameter that configures the call ticker signal for presentation. In further embodiments, the method may include communicating the call ticker signal to the destinations communications address and may also include presenting the call ticker message of the call ticker signal via the receiving party communications device.

According to other embodiments, a call ticker communications method includes receiving a communications signal from a calling party's communications device to a communications network and using the communication signal to generate a call ticker signal. Similar to above, the call ticker signal includes a call ticker message and an identifier of a calling party, an identifier of the originating communication address, and/or an identifier of a destination communications address. The method may further include communicating the call ticker message and/or the call ticker signal to the destinations communications address. Still further, the method may include querying a database for acceptance of the call ticker message and/or for presentation capabilities. If transmission of the call ticker message is initiated, then the method includes formatting the call ticker message for presentation to the destination communications address and transmitting the call ticker message to the destination communications address. If transmission of the call ticker message is not initiated, then the method includes retrieving a call ticker delivery failure notification and transmitting the message delivery failure notification to a communications address of the calling party's communications device.

Further details on these embodiments and other possible embodiments of this invention are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
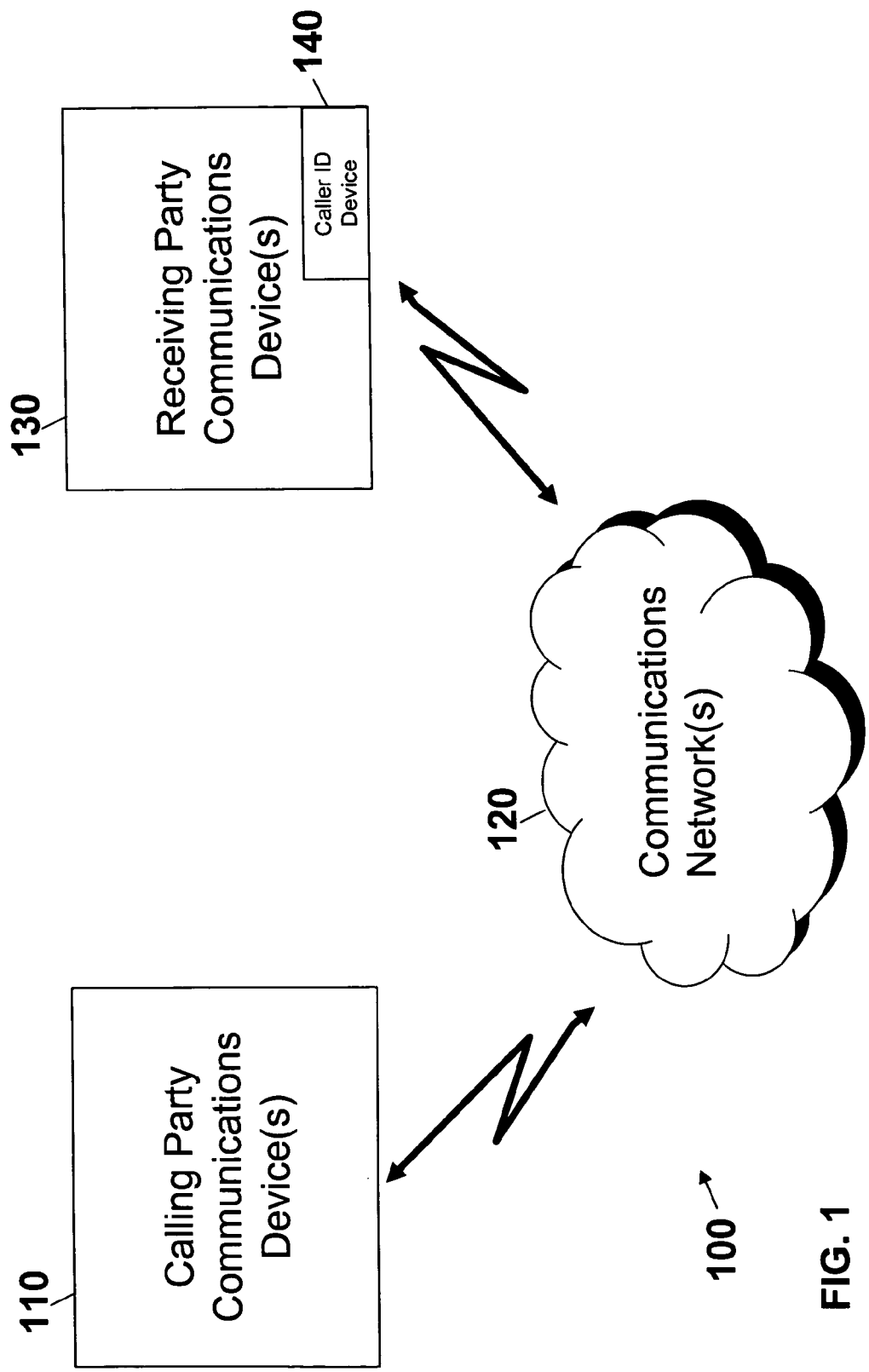
FIG. 1 is a schematic of a Call Ticker communications system illustrating a communications network connecting a calling party's communications device with a receiving party's communications device interfacing with a Caller ID device according to embodiments of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The Call Ticker systems and methods of this invention operate with different communications devices and communications networks to generate, enable, and/or transmit a Call Ticker Message. Typically, a communications network automates configuration and routing of a Call Ticker Signal that includes the Call Ticker Message and may also include an identifier of a calling party, an identifier of a destinations communications address (e.g., a telephone number associated with a receiving party's communications device), and an identifier of an originating communications address. The Call Ticker Signal may be generated by a communications device that interfaces with the communications network, by a Call Ticker Module operating in a computer system that interfaces with the communications network, and/or by the communications network. Some advantages of this invention include the ability to use a conventional Plain Old Telephone Service (POTS) phone (and/or alternate communications device) connected with the communications network to generate a Call Ticker Message and/or to establish a Call Ticker Profile that may be used to generate a Call Ticker Message, the ability of the communications network to transmit the Call Ticker Message to a conventional Caller ID device as well as other communications devices capable of presenting the Call Ticker Message, the ability of the communications network to identify the receiving party's communications device and to format the Call Ticker Message for presentation by the receiving party's communications device, the ability to use a Call Ticker Device to generate, respond to, forward, and/or otherwise manage a Call Ticker Message (and other information that may be transmitted with the Call Ticker Signal), the ability to transmit the Call Ticker Message to numerous communications devices associated with a receiving party, and the ability to identify whether the receiving party's communications device blocks or does not accept the Call Ticker Message and, if so, to notify the calling party of the Call Ticker Message delivery failure.

As used herein, the term "communications device" includes wired and wireless communications devices, such as a POTS phone, a mobile phone, a wireless phone, a WAP phone, a satellite phone, a computer, a modem, a pager, a digital music device, a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with a receiving party, and/or (4) one or more Call Ticker Profiles associated with the Call Ticker Signal. In various embodiments, the data may be stored by the communications network, a peripheral storage device connected to the communications network, other connected networks, the Caller ID device, the Call Ticker Device, the receiving party's communications device, and/or the calling party's communications device.

Referring now to the figures, FIG. 1 illustrates a Call Ticker communications system 100 including a calling party's communications device 110, at least one communications network 120, and a receiving party's communications device 130 having (or coupled with) a Caller ID device 140. Typically, the receiving party (e.g., a customer and/or a user) subscribes to a Call Ticker Service that enables the receiving party's communications device 130 to receive a Call Ticker Message. The Call Ticker Message is data that supplants conventional Caller ID information of an incoming line identification (ICLID) signal according to a Call Ticker Profile. According to an embodiment, the receiving party's communications device 130 accesses the communications network 120 to create and/or access a Call Ticker Profile that generates and/or otherwise manages the Call Ticker Message. For example, the communications network 120 may present an interactive interface to the user of the receiving party's communications device 130 and/or the calling party's communications device 110 that may be programmed over a variety of mediums, such as, for example, a voice-activated and/or Dual Tone Multi-Frequency (DTMF) menu prompt. The user, for example, might select to access stored Call Ticker Signals by entering a "1" on a touch-tone keypad or by speaking into a receiving audio subsystem and stating the word "one." This entry would then prompt the user through choices such as accessing recently sent Call Ticker Signals, alphanumeric listings of each receiving party, and so on. After making a selection, the communications network 120 retrieves the stored Call Ticker Signal from a database. In addition, the user might enter a code (e.g., "*99") in order to automatically block any exchange of Call Ticker Signals. Similarly the user could unblock and allow the exchange of Call Ticker by entering another code. For example, the receiving party's communications device 130 may connect with a Call Ticker access address (e.g., a toll-free number, a local access address, etc.) of the communications network 120 that prompts (e.g., voice-menu activated) the user to select and/or enter template data (also referred to herein as a "Call Ticker Profile") for the Call Ticker Message. That is, for example, if the customer wanted to receive a Call Ticker Message for a stock quote on an hourly basis, then the communications network 120 would interact with the receiving party's communications device 130 to obtain information to search, select, and/or receive the stock symbol, to obtain an origination address for the stock quote (e.g., a communications address associated with a calling party's communications device (such as, 800-4STOCKS), a communications address of a data network (such as, www.stockticker.com), and the like), to obtain time parameters for transmitting the "live" stock quote, such as, minutes, hours, and days of week, and for discontinuing transmission, and to obtain information to search, select, and/or receive one or more destinations communications address (e.g., the receiving party's home telephone number, cellular phone number, interactive pager address, etc.) to transmit the Call Ticker Message. According to other embodiment, the receiving party may alternatively contact (e.g., via a voice communication, via a web-based interface, and the like) a telecommunications service provider (or alternate communications provider) to subscribe to Call Ticker Messaging and/or to establish the Call Ticker Profile.

The communications network 120 detects and decodes an incoming line identification signal (ICLID) and/or a Call Ticker Signal, compares the incoming Call Ticker Signal with the Call Ticker Profile stored in one or more databases of the communications network to determine one or more destination communications addresses of the receiving party, whether the destination communications address(es) accepts Call Ticker Signals, and/or presentation capabilities of the receiving party's communications device 130 associated with each destination communications address. Typically, the Call Ticker Signal includes the Call Ticker Message, an identifier of a calling party (e.g., name, workstation, name of employer, phone number, and the like), an identifier of a destinations communications address (e.g., receiving party's telephone number, receiving party's IP address, and the like), and/or an identifier of the calling party's communications device (e.g., cellular phone, personal digital assistant, and the like). The communications network 120 transmits the Call Ticker Signal to the receiving party's communications device 130 and/or the Caller ID device 140 for presentation of the Call Ticker Message.

Figure 2:
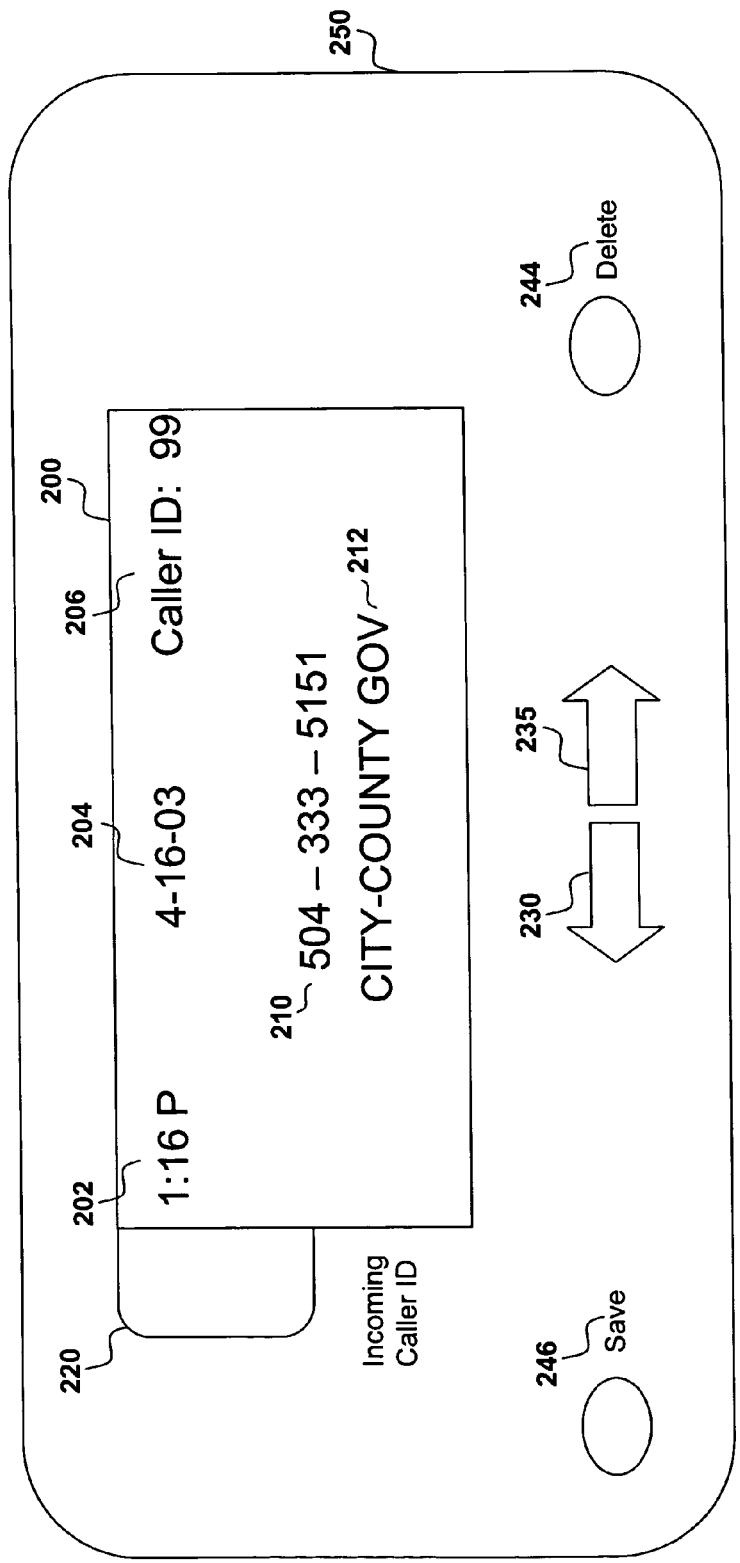
FIG. 2 is a perspective front view of a Caller ID device illustrating a screen display for conventional Caller ID data of an incoming line identification signal (labeled "PRIOR ART") according to embodiments of this invention.
Figure 3:
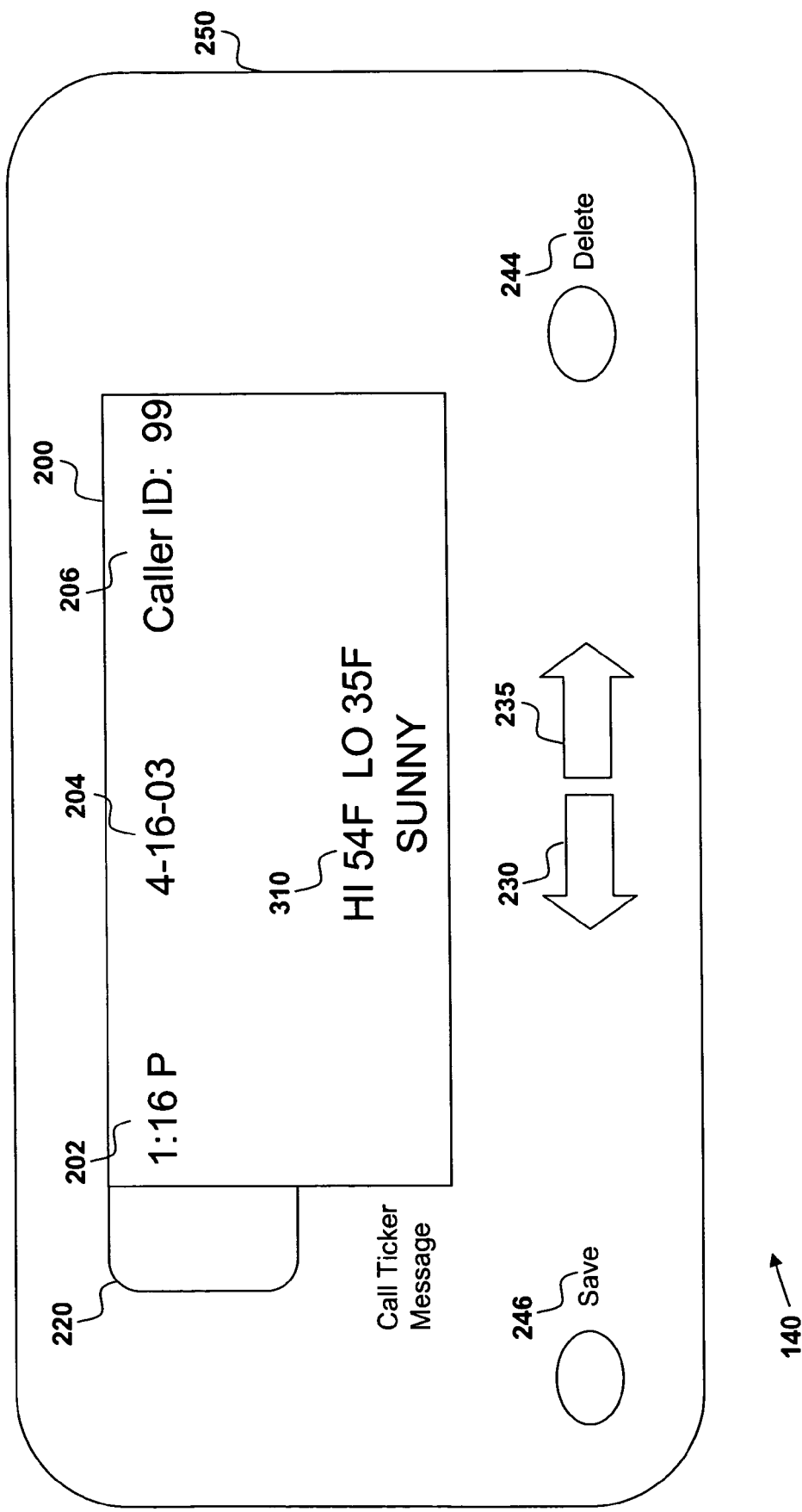
FIG. 3 is a perspective front view of a Caller ID device illustrating a screen display supplanting a Call Ticker Message of a Call Ticker Signal instead of the Caller ID data displayed in FIG. 2 according to embodiments of this invention.
Figure 4:
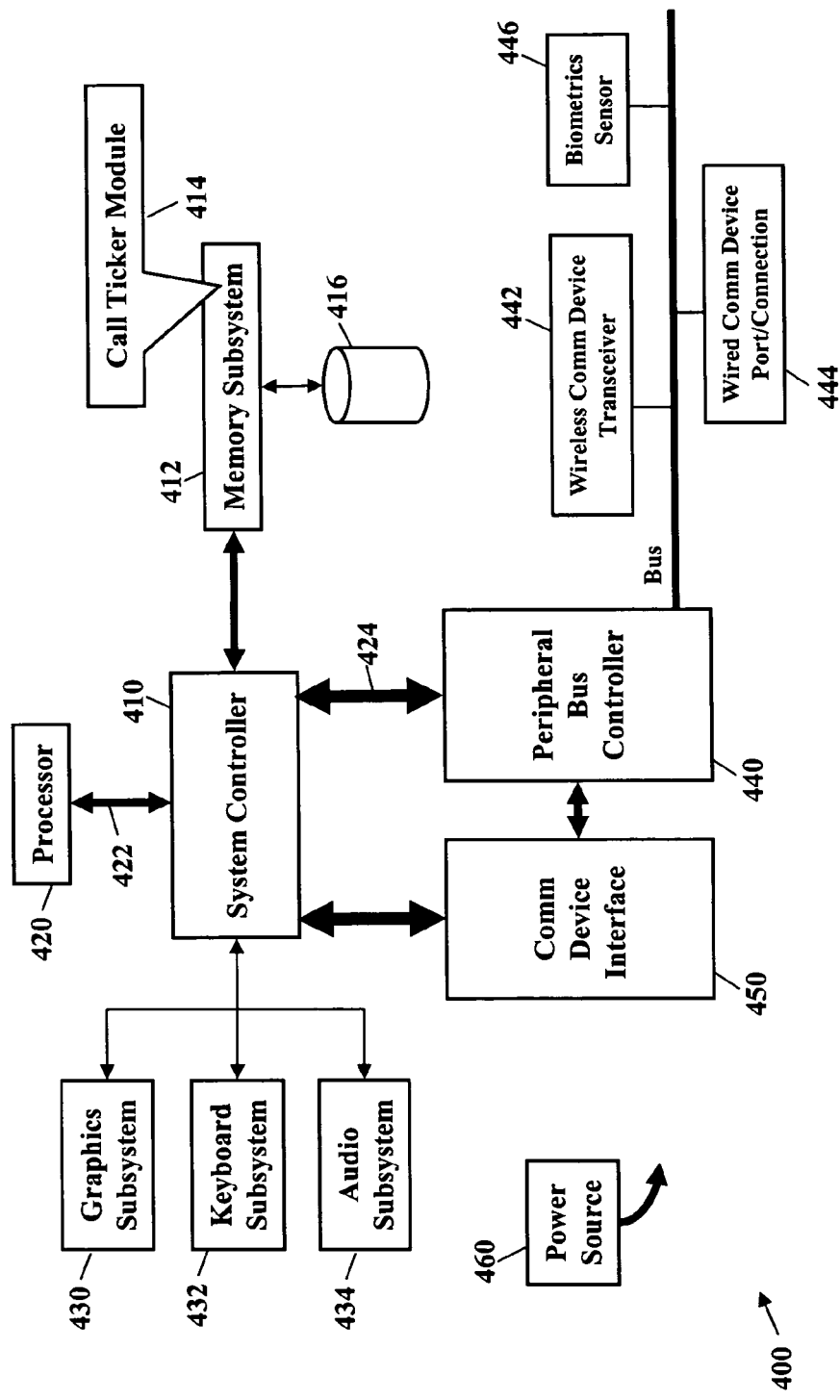
FIG. 4 is a block diagram of a Call Ticker Module residing in a computer system according to embodiments of this invention.

As illustrated in FIGS. 2 and 3, the receiving party's communications device 130 is coupled with the Caller ID device 140. The Caller ID device 140 includes a display screen 200 having a time identifier 202, a date identifier 204, a numeric identifier of an incoming Caller ID signal (e.g., ICLID signal) 206, a lighted panel 220 that alerts the receiving party of a new, incoming, and/or stored Caller ID, a left arrow button 230, a right arrow button 235, a "Delete" punch button 244, a "Save" punch button 246, and a housing 250 that protects the internal componentry of the Caller ID device 140. Typically, the Caller ID device 140 receives an incoming ICLID signal and displays an originating NANP number 210 (shown as "504-333-5151" of FIG. 2) and a name 212 associated with the originating NANP number (shown as "CITY-COUNTY GOV" in FIG. 2). Conventional Caller ID devices comply with standards known in the art that limit the display of the ICLID signal to two lines of text, each line containing approximately fifteen (15) characters. As shown in FIG. 3, this invention supplants and/or substitutes the ICLID signal (the NANP number 212 and name 212) with a Call Ticker Message 310 (shown as "HI 54F LO 35F SUNNY" in FIG. 3) of the Call Ticker Signal so that a short customized message (i.e., the Call Ticker Message) is displayed or otherwise presented by the conventional Caller ID device 140.

FIG. 3 is a block diagram showing a Call Ticker Module 414 that operates within a system memory device 412 of a computer 400. The Call Ticker Module 414, however, could also reside in flash memory, a peripheral storage device 416, and/or an alternate communications device (such as, for example, a Call Ticker Device 800 of FIG. 9). The computer 400 also has one or more central processors 420 executing an operating system. The operating system, as is well known, has a set of instructions that control the internal functions of the computer 400. A system bus 422 communicates signals, such as data signals, control signals, and address signals, between the central processor(s) 420 and a system controller 410. The system controller 410 provides a bridging function between the memory subsystem 412, the one or more central processors 420, a graphics subsystem 430, a keyboard subsystem 432, an audio subsystem 434, a PCI (Peripheral Controller Interface) bus 424, and a Communications ("Comm") Device Interface 450. The PCI bus 424 is controlled by a Peripheral Bus Controller 440. The Peripheral Bus Controller 440 is an integrated circuit that serves as an input/output hub for various peripheral ports and/or transceivers. These peripheral ports allow the computer 400 to communicate with a variety of communications devices through networking ports (such as SCSI or Ethernet) that include Wireless Communications ("Comm") Device Transceiver 442 (such as Wireless 802.11 and Infrared) and Wired Communications ("Comm") Device Port/Connection 444 (such as modem V90+ and compact flash slots). These peripheral ports could also include other networking ports, such as, a serial port (not shown) and/or a parallel port (not shown). The Comm Device Interface 450 allows the computer 400 to monitor, detect, receive, and decode incoming communications signals to the communications device(s) connected to the Wireless Comm Device Transceiver 442 and/or the Wired Comm Device Port/Connection 444. Further, the Comm Device Interface 450 communicates the Call Ticker Signal to the Wireless Comm Device Transceiver 442 and/or the Wired Comm Device Port/Connection 444. Still further, the computer 400 may include a power source 460, such as a rechargeable battery to provide power and allow the computer 400 to be portable. In alternate embodiments, the computer 400 could include its own telephone line (or other communications connection) to the communications network 120 (not shown). Another alternative may include the computer 400 incorporated into a specially designed communications device (not shown).

The system memory device (shown as memory subsystem 412 or peripheral storage device 416) may also contain one or more application programs. For example, an application program may cooperate with the operating system and with a video display unit (via graphics subsystem 430) to provide a GUI for the Call Ticker Module 414. The GUI typically includes a combination of signals communicating with the graphics subsystem 430 and/or the keyboard subsystem 432. The GUI provides a convenient visual and/or audible interface with the user of the computer 400. As is apparent to those of ordinary skill in the art, the user (e.g., receiving party, calling party, and/or administrator) interacts with the Call Ticker Module 414 over a variety of mediums, such as, for example, a stylus, keyboard, and punch buttons of the keyboard subsystem 432, a display screen of the graphics subsystem 430, and/or a voice-activated menu prompt of the audio subsystem 434. Additionally, the peripheral bus controller 440 provides an interface with a biometrics sensor 446, such as, for example, a fingerprint ID device. The biometrics sensor 446 may provide security features that prevent unauthorized users from exploiting the computer 400. The biometrics sensor 446 could also comprise retina recognition device and software, DNA/RNA recognition device and software, facial recognition device and software, speech recognition device and software, and/or scent recognition device and software.

Figure 5:
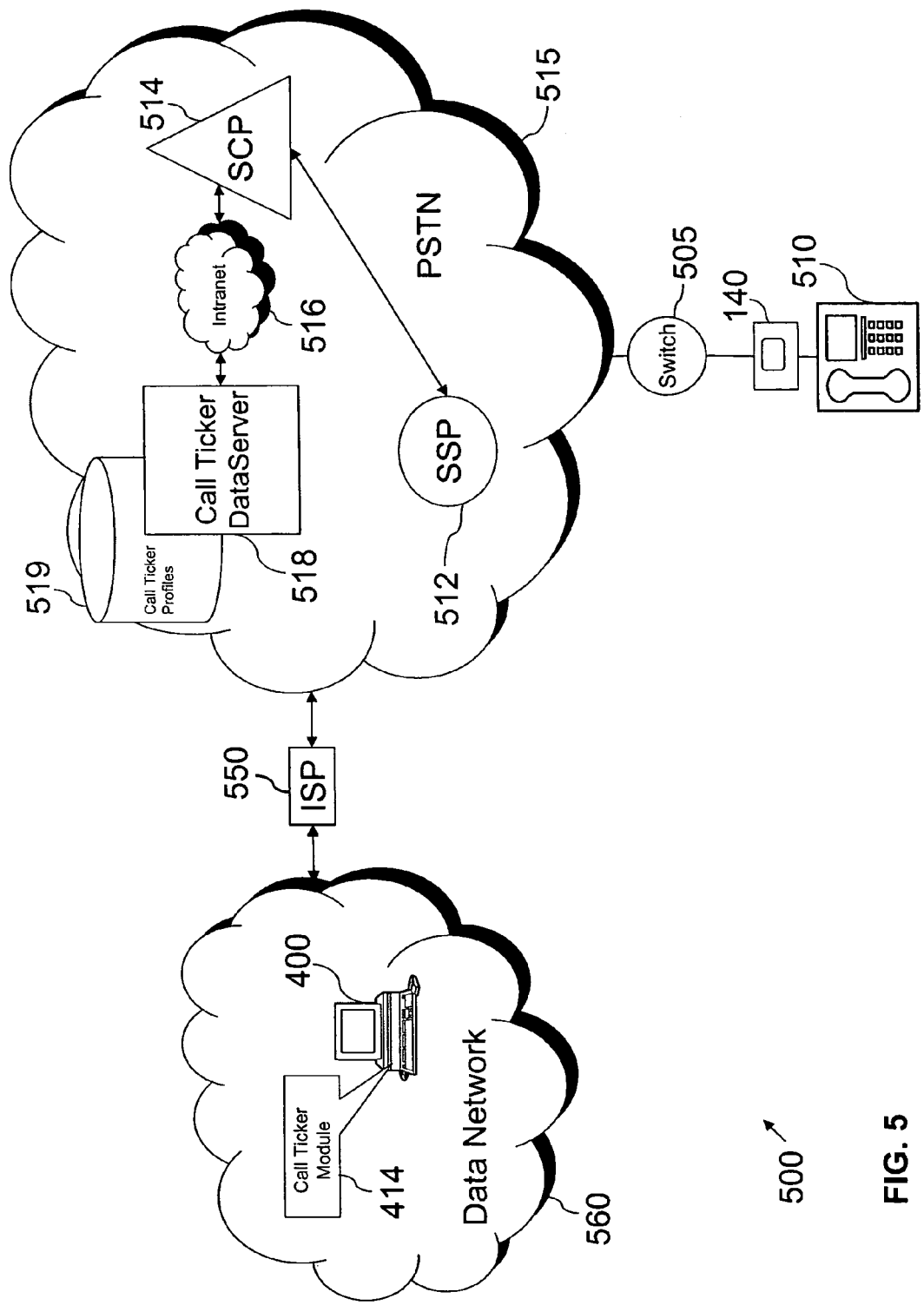
FIG. 5 is another schematic of Call Ticker communications system illustrating the communications connections of a receiving party's communications device, a Caller ID device, one or more communications network(s), and the computer system of FIG. 4 according to embodiments of this invention.

FIG. 5 is a schematic of a Call Ticker communications system 500 illustrating communications connections of the communications network(s) with one or more of the receiving party's communications devices. The communications system 500 includes a POTS phone 510 coupled with the Caller ID device 140, a communications switch 505 connected to a telecommunications network 515 that includes a service switching point (SSP) 512, a service control point (SCP) 514, an Intranet 516 (for the telecommunications provider to administer and program the telecommunications network 51 components and/or for the subscriber to access, program, and/or otherwise manage a Call Ticker Profile), a Call Ticker Dataserver 518, a database of one or more Call Ticker Profiles 519, an Internet Service Provider (e.g., America On-Line) 550, and a data network 560 having the computer 400 with the Call Ticker Module 414. The switch 505 allows the connected communications devices 510, 140 to transceive electronic communication signals via the telecommunications network 515 (e.g., a central office (CO), a mobile telephone switching office (MTSO), and/or a combination CO/MTSO). The telecommunications network 515 may use any means of coupling the switch 505 to the telecommunications network 515, but the coupling means is preferably high-capacity, high-bandwidth optical transport services, Gigabit Ethernet services, and/or the like. As those of ordinary skill in the art of telecommunications understand, the telecommunications network 515 could also link the switch 505 via other appropriate means, such as, for example a Synchronous Optical Network (SONET) structure with redundant, multiple rings.

According to an embodiment, a customer and/or user of Call Ticker Services (e.g., someone who subscribes to and/or someone who uses Call Ticker Services) uses the POTS phone 510 to gain access to the telecommunications network 515 and to establish a Call Ticker Profile that is subsequently used to generate and/or otherwise manage a Call Ticker Signal having a Call Ticker Message. For example, if the customer wanted to receive a Call Ticker Message for a stock quote on an hourly basis, then the customer might use phone 510 and dial a Call Ticker Access Number (e.g., a telephone number that provides access to programming Call Ticker Services, such as a voice activated menu, dual tone frequency interactions, and so on) of the telecommunications network 515. For example, the user may interact with phone 510 and a Call Ticker Module 414 residing within the telecommunications network 515 to search, select, and/or receive the stock symbol, to obtain an origination address for the stock quote (e.g., a communications address associated with a calling party's communications device (such as, 800-4STOCKS), a communications address of a data network (e.g., www.stockticker.com), and the like), to obtain time parameters for transmitting the "live" stock quote, such as, minutes, hours, and days of week, and for discontinuing transmission, and to obtain information to search, select, and/or receive one or more destinations communications address (e.g., the receiving party's home telephone number, cellular phone number, interactive pager address, etc.) to transmit the Call Ticker Message. According to other embodiments, the user may alternatively contact (e.g., via a phone call, email, filling out a web-based form, and so on) a telecommunications service provider (or alternate communications provider) to have an administrator, other personnel, and/or componentry of the telecommunications service provider establish the Call Ticker Profile. For example, the user may use the computer 400 and the Call Ticker Module 414 to establish a Call Ticker Profile that is communicated to telecommunications network 515. Alternatively, the user could use computer 400 and a web-based interface of the Intranet 516 to establish the Call Ticker Profile. Regardless of how the Call Ticker Profile is established, the Call Ticker Profile is used to generate and/or otherwise manage a Call Ticker Signal having the Call Ticker Message that is communicated to the phone 510. The Call Ticker Signal is routed through the telecommunications network 515 to phone 510 via switch 505. The Call Ticker Signal, and/or other communications signals (e.g., ICLID) that are typically associated with an origination communications address (e.g., address of calling party's communications device), arrive at SSP 512 that analyzes the signal(s) and routes the Call Ticker Signal to the SCP 514 and then to the Call Ticker DataServer 518 for further Call Ticker Signal processing and routing information. The Call Ticker DataServer 518 accesses the database 519 of Call Ticker Profiles to determine communication preferences of the receiving party's (e.g., the user's) communications device. For example, the Call Ticker Profile includes parameters that identify if the receiving party's communications device accepts Call Ticker Messages, blocks Call Ticker communications, and provides alerts of incoming Call Ticker Messages. Further, the Call Ticker Profile includes presentation capabilities of the destination communications address and/or the receiving party's communications device, such as phone 510, and/or to obtain other preferences, instructions, files, and/or associated Call Ticker Services as described herein. Thereafter, the telecommunications network 515 may transmit the Call Ticker Signal (or a portion of the Call Ticker Signal, such as just the Call Ticker Message) via switch 505 to the Caller ID device 140 and/or to the phone 510

Figure 6:
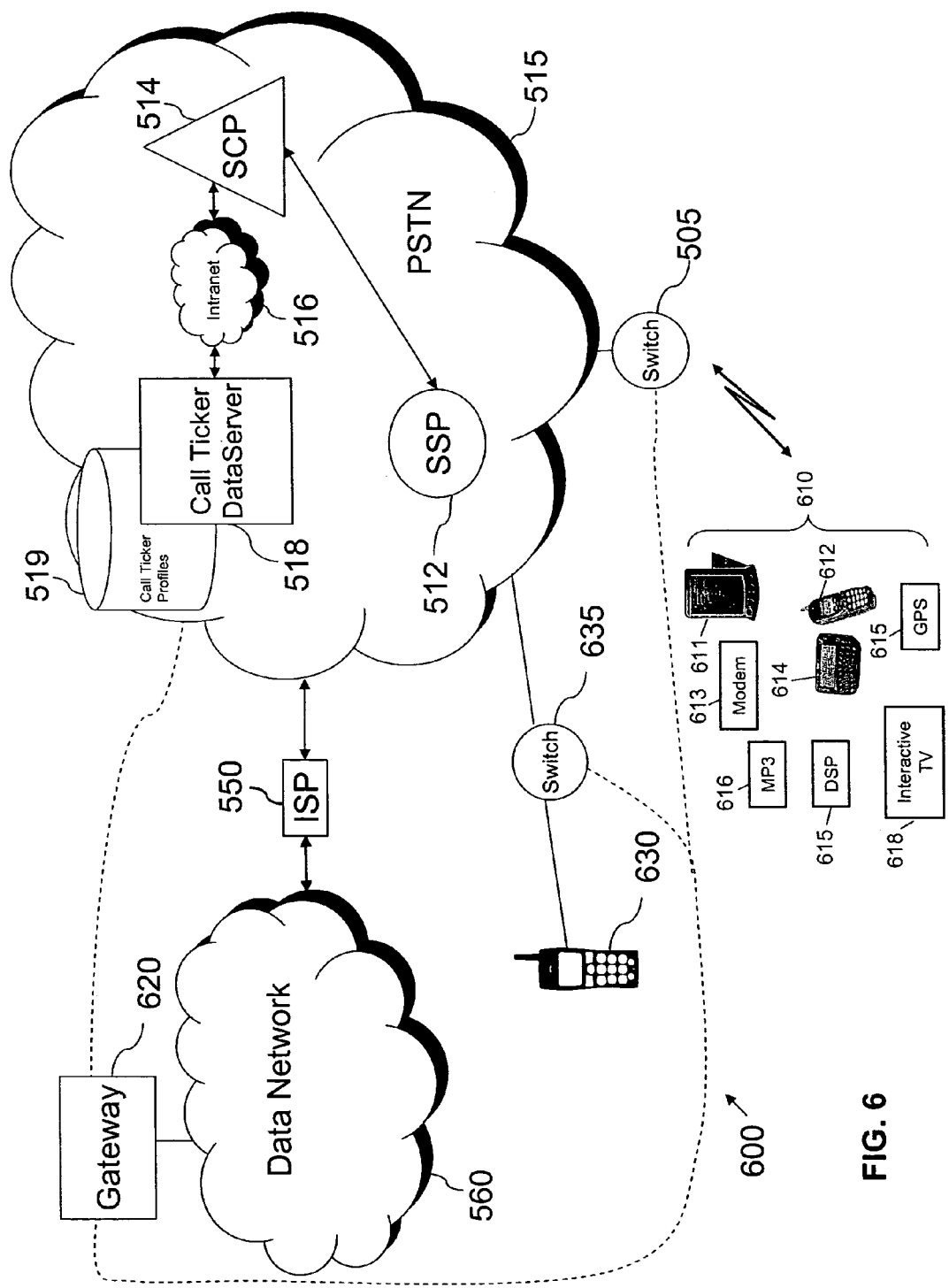
FIG. 6 is another schematic of a Call Ticker communication system illustrating a wireless communications device, alternate receiving party's communications devices, and the communications network(s) according to embodiments of this invention.

FIG. 6 is a schematic of a Call Ticker communications system 600 similar to the Call Ticker communications system 500 disclosed in FIG. 5. However, Call Ticker communications system 600 illustrates alternative communications devices 610 of the receiving party that include a Personal Digital Assistant (PDA) 611, an IP phone 612, a modem 613, an interactive pager 614, a global positioning system (GPS) 615, an MP3 player 616, a digital signal processor (DSP) 617, and an interactive television 618, and also illustrates a communications connection of a calling party's communications device, shown as a mobile phone 630, with a communications switch 635 coupled with the telecommunications network 515. Regardless of the receiving party's communications device (reference numerals 611-618) that receives the Call Ticker Signal, this information may need to be formatted accordingly for the receiving party's communications device (including audio, text (e.g., ASCII), video, other digital formats, and combination thereof). Accordingly, the Comm Device Interface 450, the Call Ticker DataServer 518 (via the Call Ticker Profile), and/or the gateway 620 of the data network 560 has the intelligence for appropriate formatting of the Call Ticker Signal for transmission to the receiving party's communications device. For example, if the calling party's communications device uses the Wireless Application Protocol (WAP) technique, then the Call Ticker Signal is formatted using the Wireless Mark-up Language (WML) and must be configured for Caller ID standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means. Alternatively, the Call Ticker Signal may be formatted and/or otherwise configured for presentation by an application and/or componentry of the receiving party's communications device 610.

As shown in FIG. 6, the telecommunications network 515 may alternatively transmit the Call Ticker Signal via ISP 550 (or other connection) of the data network 560. The data network 560 communicates the Call Ticker Signal via the gateway 620 to the receiving party's communications device 610 via switch 505 and/or to a calling party's communications device 630 via switch 635. Similarly, the calling party's communications device 630 may generate and/or otherwise establish the Call Ticker Signal and communicate the Call Ticker Signal via the gateway 560 to data network 560 and/or to telecommunications network 515. Another embodiment discloses the telecommunications network 515 communicating the Call Ticker Signal directly to the gateway 620 (such as when a Call Ticker Profile associates a static IP address of the receiving party's communications device 610) to communicate with the receiving party's communications device 610 and/or with the calling party's communications device 630. In addition to transmitting the Call Ticker Signal, the telecommunications network 515 may also connect the calling party's communications device 630 with the receiving party's communications device 130 to establish an immediate voice connection (e.g., establish a telephone call). That is, for example, if the receiving party's communications device 610 provides an alert (e.g., ringing, audio indicator, visual indicator, and so on) of the incoming Call Ticker Message and if the receiving party wants to act on the Call Ticker Message (such as, for example, to sell a particular stock when it reaches a certain value), then the Call Ticker Profile may provide a communication response to and/or a call handling option for the Call Ticker Signal. For example, the Call Ticker Profile may provide that Call Ticker Signal include both a data burst (that provides the Call Ticker Message) as well as a voice signal (that allows for a voice conversation) with a selected party. That is, the Call Ticker Signal may provide a data burst containing data retrieved from an on-line origination communications address (e.g., www.schwab.com) to generate the Call Ticker Message. When the Call Ticker Message is displayed, the receiving party may view the Call Ticker Message, and, thereafter, create an off-hook state that prompts the telecommunications network 515 and/or the data network 560 to establish communications with another communications address. For example, the Call Ticker Profile may contain a communications address for establishing a voice communication and/or a data communication if an off-hook state is detected within a selected time period (e.g., thirty seconds or less) of transmission of the Call Ticker Message. That is, for example, if the receiving party created an off-hook state of phone 510 within thirty seconds after transmission of the Call Ticker Signal, then a communications connection would automatically be established with a communications address (e.g., a phone number of a stockbroker) of the Call Ticker Profile associated with the Call Ticker Signal.

Figure 7:
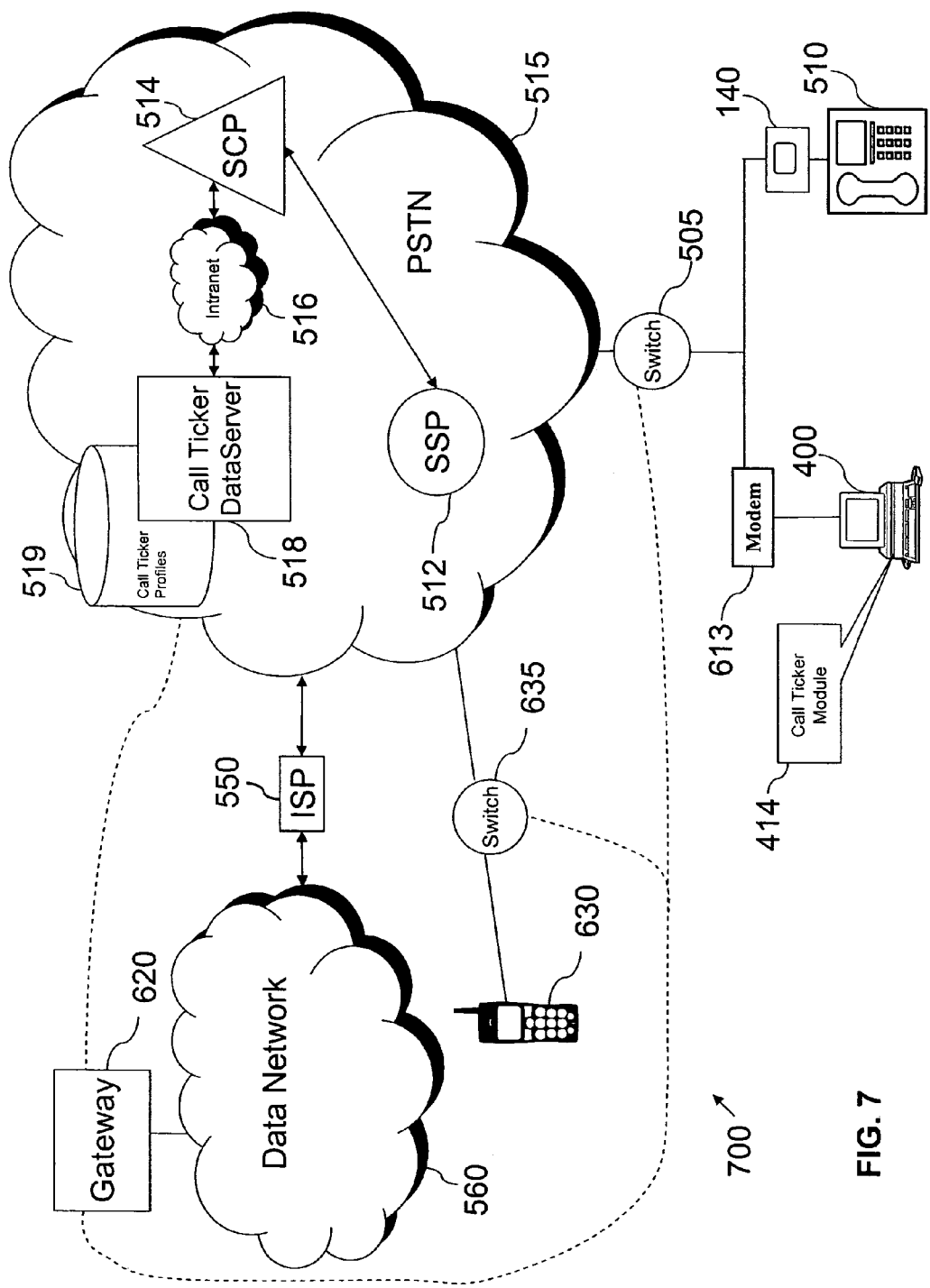
FIG. 7 is another schematic of a Call Ticker communications system illustrating a wireless communications device, a personal computer having a Call Ticker Module, the receiving party's communications device, the Caller ID device, and the communications network(s) according to an embodiment of this invention.

FIG. 7 is a schematic of a Call Ticker communications system 700 similar to the Call Ticker communications systems 500, 600 disclosed in FIGS. 5-6. However, Call Ticker communications system 700 illustrates the computer 400 having the Call Ticker Module 414 and modem 613 coupled with phone 510 and Caller ID device 140. For example, this embodiment is applicable when the receiving party subscribes to Digital Signal Line (DSL) services that provide for the computer 400 and the phone 510 to share a communications connection with the telecommunications network 515 and the data network 560. Furthermore, this communications system 700 also provides that the receiving party's computer 400 may be a stand alone computer, rather than integrated with the data network 560. The receiving party (and/or user) is able to use the Call Ticker Module 414 similar to the embodiments described herein to control Call Ticker Services. For example, the receiving party may interact with the Call Ticker Module 414 and with Intranet 516 to access and login to the Call Ticker DataServer 518 to establish the Call Ticker Profile in the database 519. Alternatively, an administrator of the telecommunications network 515 (or a calling party who has an authorization code from the customer and/or receiving party) could similarly use another personal computer (not shown) and/or alternate workstation (not shown) networked with the Intranet 516 to access, add, delete, store, modify, and manage the database 519 of one or more Call Ticker Profiles.

In general, the Call Ticker Profiles of the Call Ticker DataServer 518 control access, generating, notification, routing, security, transactions, troubleshooting, management, sharing, and/or additional processing of Call Ticker Signals exchanged to/from telecommunications network customers, users, and non-customers. More specifically, the Call Ticker Profiles establish preferences for processing the Call Ticker Signal including (1) a template for the Call Ticker Message (e.g., stock symbol, current price, high value, low value, average value, yesterday's closing value, amount of shares owned by subscriber, etc.), (2) a Call Ticker Message, (3) an identifier for an originating communications address (e.g., www.schwab.com\callticker), (4) an identifier of the destinations communications address (e.g., 757-253-000), (5) an identifier of a receiving party's communications device (e.g., a Caller ID device), (6) a call ticker service feature, and/or (7) a call ticker default service feature. The Call Ticker Service Features include (1) a billing parameter for communication of the call ticker signal over the communications network, (2) a timing parameter that enables the call ticker signal for selected times of day and days of week, (3) a do not disturb parameter that disables notification of the incoming call ticker signal to the destination communications address (e.g., disables a ringer, disables a flashing light, and disables other alerts of incoming communications to the receiving party's communications device), (4) a priority parameter that identifies a selected importance of the call ticker signal (e.g., communicate the Call Ticker Message for John's stocks over communicating the ICLID signal of a voice call), (5) a call waiting parameter that communicates the call ticker signal during on on-hook state of the receiving party's communications device of the destinations communications address, (6) a disable parameter that disables the call ticker signal for selected times of day and days of week, (7) a block parameter to block the call ticker signal, (8) an identification and authentication parameter to validate at least one of the call ticker signal and the originating communications address, (9) a memory service parameter for data stored with the call ticker signal, and (10) a configuration parameter that configures the call ticker signal for presentation. For example, if the receiving party's communications device was not capable of visual presentation, the telecommunications network may include an audio call ticker application that is operable to configure a text format of the call ticker message to an audio format of the call ticker message. And thus, the Call Ticker Message is communicated in an audio format to the receiving party's communications device. Still further, the Call Ticker Profile may include parameters for (1) archiving the Call Ticker Signal to a storage device associated with the telecommunications service provider (so that a database of Call Ticker Signals including Call Ticker Messages and destinations communications addresses are stored) and/or archiving the Call Ticker Signal to alternate storage devices, (2) encrypting the Call Ticker Signal (or a portion of the Call Ticker Signal) so that only the receiving party's communications device can decipher the Call Ticker Message, (3) copying the Call Ticker Signal, and (4) associating the Call Ticker Signal with a variety of fields, files, and/or other data for Call Ticker Services, such as, for example login information associated with the customer, user, and/or administrator, password, telephone number(s) or Service Node(s) of the customer (this may include a plurality of addresses that are associated with a Service Node or other switch serving the calling party's communications device 110), TCP/IP address of the customer, email address of the customer, a time or date identifier (e.g., day of week or calendar date), other information associated with the incoming line identification (ICLID) communications signal, size and content of Call Ticker Signal, reply(s), delivery failure notification(s), display and/or presentation data associated with a GUI (e.g., color, font, placement of the Call Ticker Message on a display of the receiving party's communications device), and/or telecommunications network 515 defaults. In addition, the Call Ticker Profile may include instructions for troubleshooting problems including error messages. Thus, Call Ticker DataServer 518 functions as a computer server, database, and/or processor that is dedicated to managing Call Ticker Services including communications of Call Ticker Signals over the telecommunications network 515 to other connected networks (e.g., data network 560) and/or connected communications devices (e.g., receiving party's communications device 610).

Figure 8:
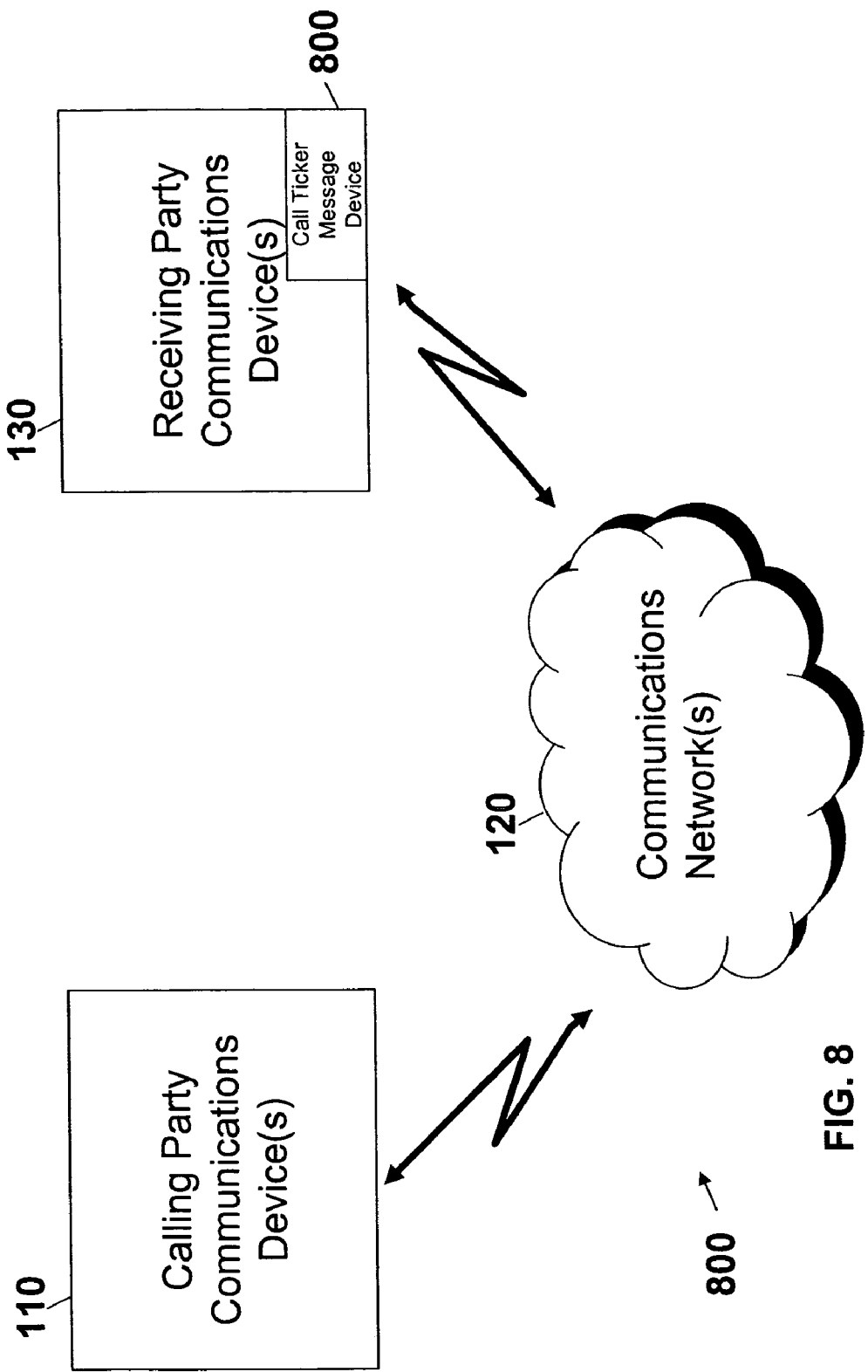
FIG. 8 is a schematic of another Call Ticker communications system illustrating a communications network connecting a calling party's communications device with a receiving party's communications device interfacing with a Call Ticker Device according to an embodiment of this invention.
Figure 9:
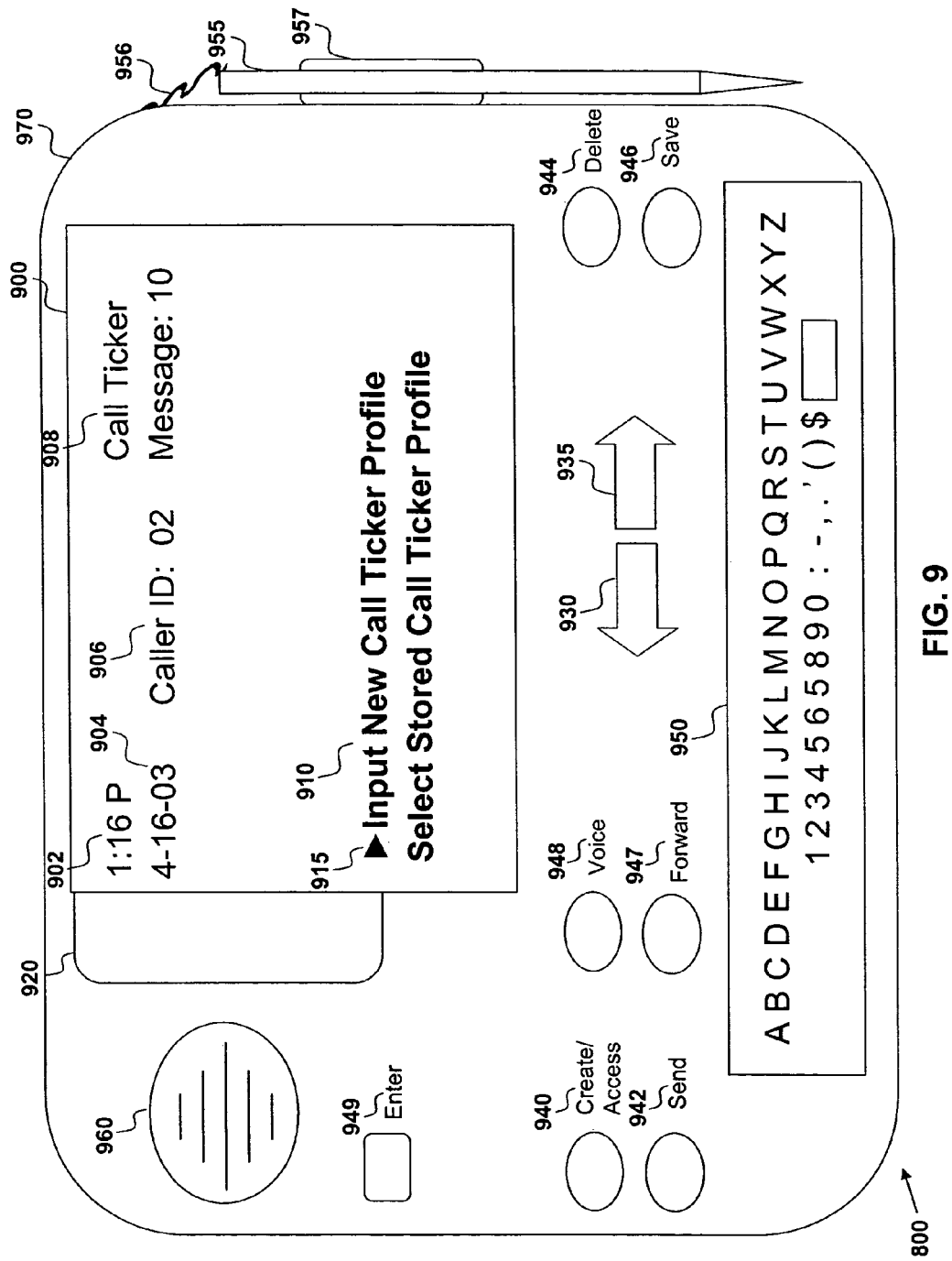
FIG. 9 is a perspective front view of the Call Ticker Device of FIG. 8 having a screen display for inputting a call ticker profile according to embodiments of this invention.
Figure 10:
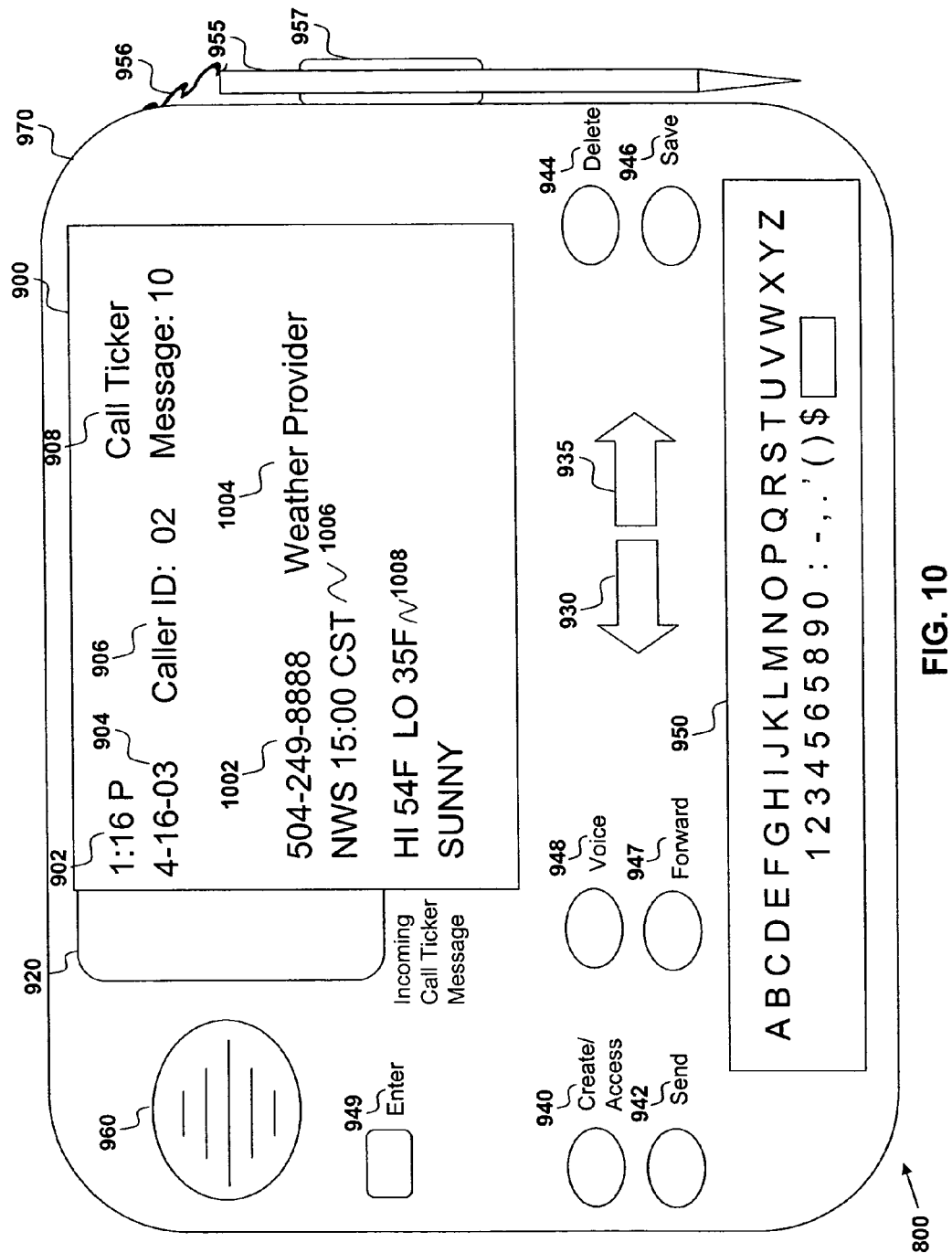
FIG. 10 is a perspective front view of the Call Ticker Device of FIG. 8 illustrating the screen display presenting a Call Ticker Message of the Call Ticker Signal according to embodiments of this invention.
Figure 11:
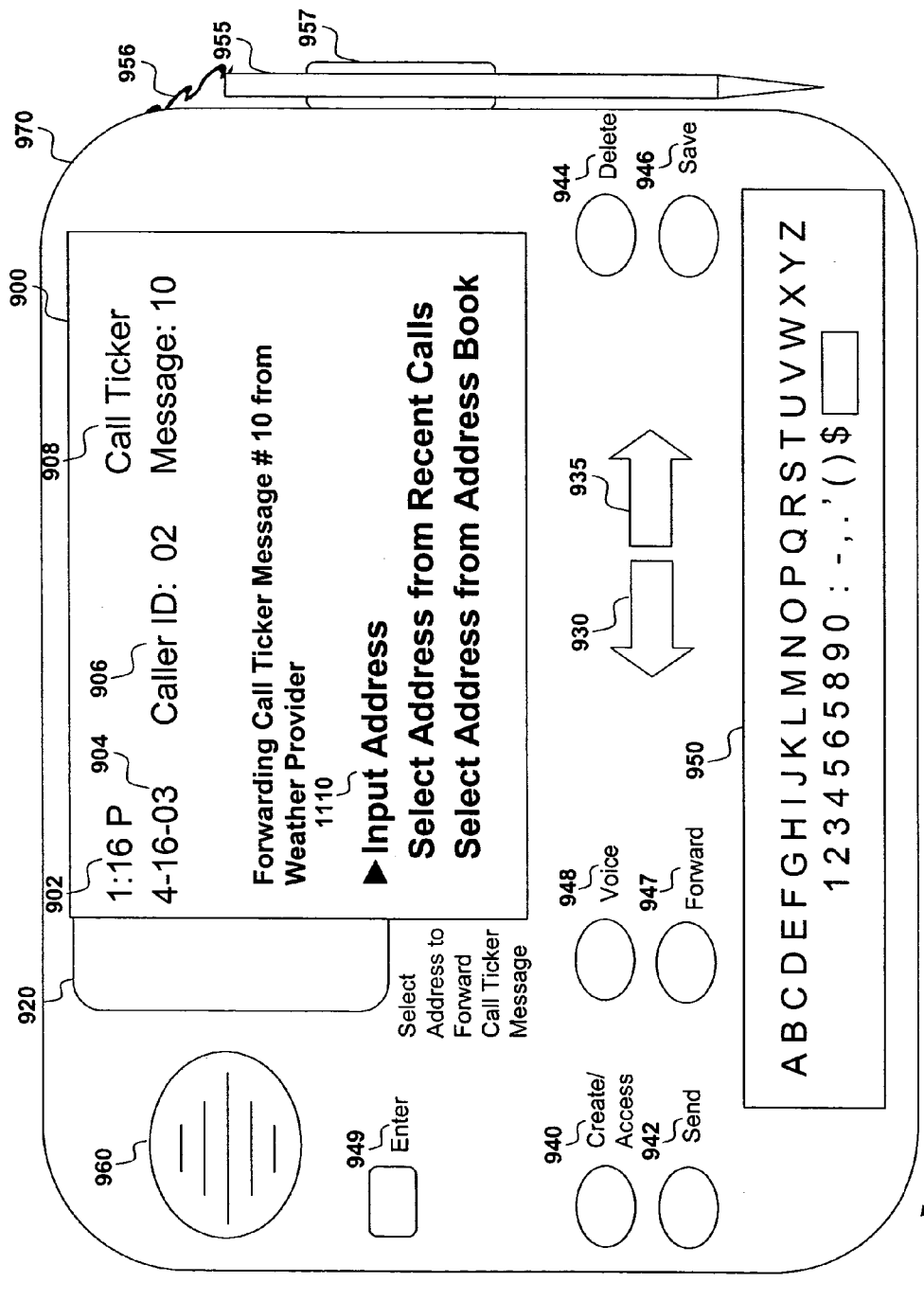
FIG. 11 is a perspective front view of the Call Ticker Device of FIG. 8 having a screen display for forwarding the Call Ticker Message and/or Call Ticker Signal of FIG. 10 according to embodiments of this invention.

Referring now to FIG. 8, a communications system 800 includes the calling party's communications device 110, the communications network, and the receiving party's communications device having a Call Ticker Message Device 800. Similar to communications system 100, the receiving party subscribes to a Call Ticker Service that enables the Call Ticker Message Device 800 to receive the Call Ticker Message. Rather than the receiving party's communications device 130 accessing the communications network 120 to create and/or access a Call Ticker Profile that generates and/or otherwise manages the Call Ticker Message, the Call Ticker Message Device creates and/or accesses a Call Ticker Profile to generate and/or otherwise manage the Call Ticker Message. As shown in FIGS. 9-11, the Call Ticker Message Device 800 includes a display screen 900 having displays for a time 902, a date 904, a numeric identifier 906 of an incoming Caller ID (ICLID signal), a numeric identifier 908 of a Call Ticker Signal, and a graphical user interface (GUI) 910 for inputting a Call Ticker Profile and/or for selecting a stored Call Ticker Profile. A pointer 915 may be used to select displayed data. The display screen 900 is capable of presenting an incoming Call Ticker Message that includes an originating communications address of "504-240-8888"1002,an identifier of the originations address as "Weather Provider"1004,an identifier of the source of a Call Ticker Message as "NWS 15:00 CST"1006 (indicating that the source is the National Weather Service (NWS) collected at 15:00 Central Standard Time (CST)), and a Call Ticker Message of "HI 54 F LO 35 F SUNNY"1008.The Call Ticker Message Device 800 also includes a lighted display panel 920 that flashes to produce a visual alert of an incoming Call Ticker Signals and/or incoming ICLID (e.g., Caller ID) signals. The Call Ticker Message Device 800 also includes a keyboard subsystem having punch buttons 930, 935, 940, 942, 944, 946, 947, 948, and 949, keyboard 950, and stylus 955. The stylus 955 is connected by a cord 956 or other appropriate connection assembly (not shown) to a housing 970 of the Call Ticker Message Device 800 and positioned in a storage holder 957 when not in use. The stylus 955 may be used to interact with the keyboard 950 and/or with the display 900 to input data (e.g., destinations communications address, communications address, and so on). Alternatively, the user could use his/her fingers or other pointed device to select each character from the keyboard 950 and/or to sketch something onto the display 900 (such as a doodle to transmit with the Call Ticker Signal). With regards to the punch buttons, they provide a convenient interface for quickly interacting with the Call Ticker Message Device 800. For example, the user may punch or press (1) a left arrow key 930 to scroll backwards through Call Ticker Messages, go back a step when interacting with the Call Ticker Module 414, and/or for other interactions with the Call Ticker Module 414, (2) a right arrow key 935 to scroll forwards through Call Ticker Messages and for other interactions with the Call Ticker Module 414, (3) a "Create/Access" button 940 to create and/or to access to a Call Ticker Profile, (4) a "Send" button 942 to send or otherwise transmit the Call Ticker Signal, (5) a "Delete" button 944 to erase a Call Ticker Message, (6) a "Save" 946 button to store a Call Ticker Message, (7) a "Forward" button 947 to forward the Call Ticker Message to another communications address, (8) a "Voice" button 948 to record a voice or other audio message (in different embodiments, the audio message may be converted from a speech-to-text message for the Call Ticker Signal and/or the audio message may be transmitted as the Call Ticker Message) and/or to convert a text Call Ticker Message from text-to-speech (such as with visually impaired customers), and (9) an "Enter" button 949 to enter and/or confirm selection of information displayed on the display screen 900. Further, the "Voice" button 948 interfaces with a speaker/recorder 960 to audibly present and/or record data of the Call Ticker Signal and/or to interact with the Call Ticker Module 414 to administer and otherwise manage the Call Ticker Message Device 800.

According to an embodiment, the user may create a Call Ticker Profile that generates a subsequent Call Ticker Signal by punching or pressing the "Create/Access" button 940 to bring up a GUI (not shown) for creating the Call Ticker Profile. In addition, if the user wants to forward a selected Call Ticker Message, then the user can use the Call Ticker Message Device 900 to forward the Call Ticker Message by pressing the "Forward" button 947 that brings up the Call Ticker Forward GUI 1110. The user may select to (1) input a new address (e.g., telephone number), (2) select an address from recent calls (including outgoing and incoming), and/or (3) select an address from an address book (created by Call Ticker Module 414). After the communications address(es) is selected, the address may be displayed on the display screen 900 for verification. Alternatively, the address may be displayed, such as, for example, "Name of Forwarding Party," "Communications Address to Contact," and so on, such that the communications address may be associated with another communications address and/or with a communications device using non-North American Numbering Plan (NANP) addressing schemes. After the forwarding communications address is input, the user presses the "Enter" button 949 to bring up another GUI (not shown) that allows the user to select a Call Ticker Message from memory. Should the user wish to erase or modify the Call Ticker Message, the user may use the left arrow button 930 to back up and re-enter the Call Ticker Message. Thereafter, the user punches or presses the "Send" button 942, and the Call Ticker Module 414 uses the input information to generate and communicate the Call Ticker Signal. The stored Call Ticker Messages may be stored by a local memory device or by a peripheral storage device (such as Call Ticker DataServer 518 shown in FIG. 5). The Call Ticker Message Device 800 initiates communications with the communications network 120 and transmits the Call Ticker Signal. In an alternate embodiment, the Call Ticker Message Device 800 may format the Call Ticker Signal for a connected or integrated communications device, and, the connected or integrated communications device would then initiate communications with the communications network 120 and transmit the Call Ticker Signal (via the connected or integrated communications device). Still, in another alternated embodiment, the Call Ticker Message Device 800 may include intelligent componentry that detects or otherwise identifies the receiving party's communications device 130 and formats or otherwise configures the Call Ticker Signal for presentation by the receiving party's communications device 130 (e.g., if the Call Ticker Message is audio data, but the receiving party's communications device 130 does not present and/or accept audio data, then the audio data is converted to text).

Figure 12:
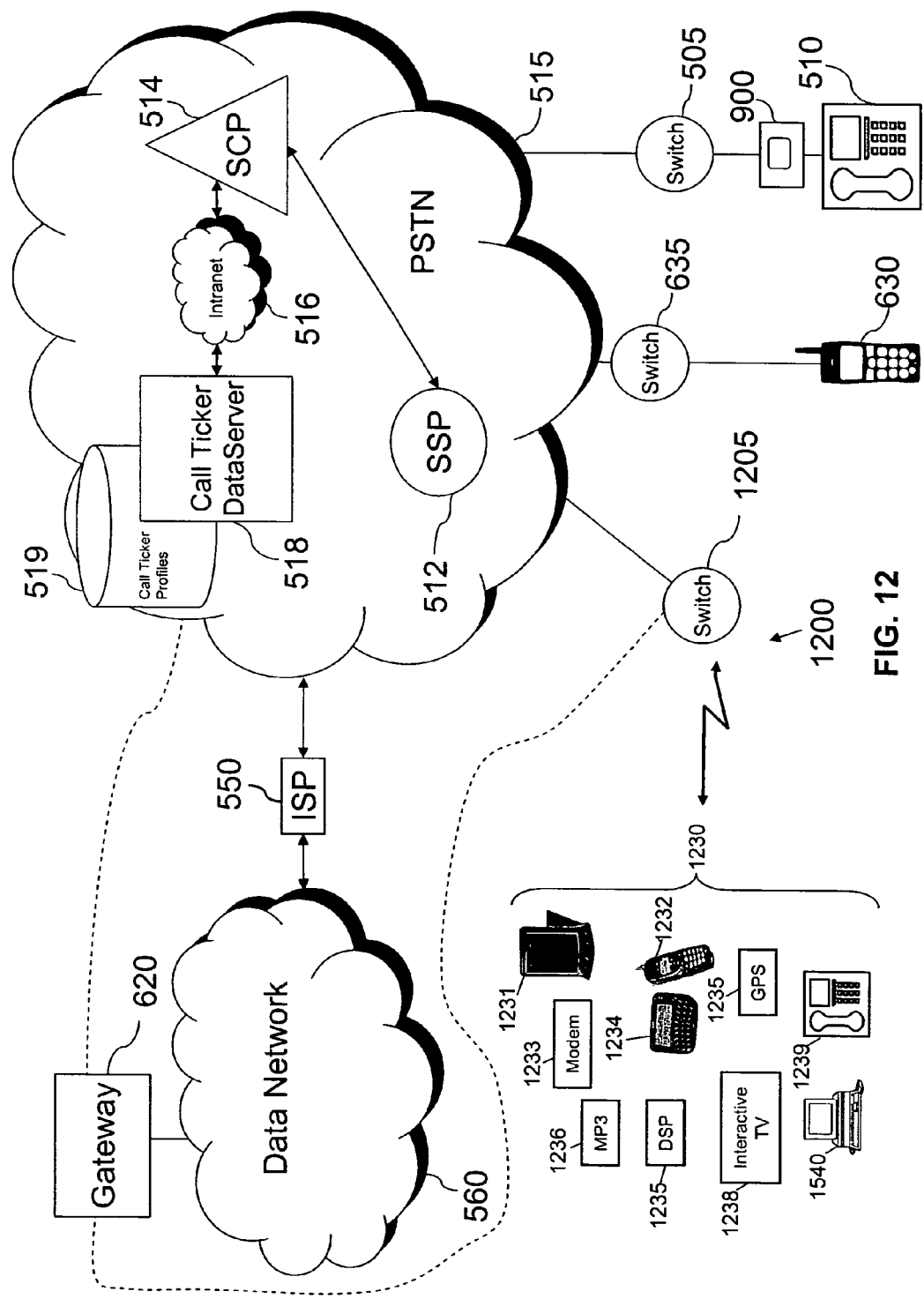
FIG. 12 is a schematic of a Call Ticker communications system illustrating the communications connections of a calling party's telephone, a receiving party's communications device and Call Ticker Device, a forwarded party's communications device(s), and the communications network(s) according to an embodiment of this invention.

Referring now to FIG. 12, another Call Ticker communications system 1200 similar to the Call Ticker communications systems 500, 600, and 700 of FIGS. 5-7 is shown; however, Call Ticker communications system 1200 includes the receiving party communications device (phone 510) coupled with the Call Ticker Message Device 800. Thus, the receiving party's communications device 510 is coupled with specialized hardware and equipment (i.e., Call Ticker Message Device 800) to engage in Call Ticker Service. For example, FIG. 10 illustrates the Call Ticker Device 800 of the receiving party presenting the incoming Call Ticker Signal (via display 900). While the Call Ticker Message shown in FIG. 10 complies with conventional formatting of Caller ID information (i.e., two lines, each with approximately fifteen characters—Line 1: "HI 54F LO 35F", Line 2: "SUNNY"), an embodiment of the Call Ticker Message Device 800 is enabled to display a Call Ticker Message having the size of less than or equal to 255 bytes, or alternatively, a Call Ticker Message that is transmitted in less than or equal to four (4) seconds. Thus, the display screen 300 is configured to have a display of at least three (3) lines by thirty (30) characters and/or to have a display capable of presenting other visual data (e.g., a picture, a map, etc.).

As further illustrated in FIG. 12, the Call Ticker communications system 1200 also allows the Call Ticker Message Device 800 to forward a Call Ticker Message originating from the originating communications address of calling party's phone 630 to alternative third party communications devices 1230 that include a Personal Digital Assistant (PDA) 1231, an IP phone 1232, a modem 1233, an interactive pager 1234, a global positioning system (GPS) 1235, an MP3 player 1236, a digital signal processor (DSP) 1237, an interactive television 1238, a POTS telephone 1239, and a personal computer 1240. One or more of the third party's communications devices 1230 receives the forwarded Call Ticker Message similar to the systems and methods described above. In alternate embodiments (not shown), one or more of the third party's communications device 1230 may include and/or be coupled with a Call Ticker Device 800 and use the Call Ticker Device 800 to engage in interactive Call Ticker conferencing (e.g., more than two parties communicating Call Ticker Messages). Still further, the calling party, the receiving party, and the third party could communicate the Call Ticker Signal, the response Call Ticker Signal, and a third party initiated Call Ticker signal during a voice connection of the calling party and the receiving party.

According to an embodiment, the Call Ticker Signal may be transmitted similar to ICLID signals for Caller ID and Caller ID Call Waiting are transmitted with an incoming call. Similarly, forwarded and/or interactive Call Ticker Messages (e.g., the user forwards the Call Ticker Message) may be communicated with an incoming communications signal. However, alternate embodiments of this invention provide that the Call Ticker Signal is transmitted during an on-hook state of the receiving party's communications device such that a data burst is transmitted and/or received during an active connection (e.g., during a conversation). Further, the Call Ticker Signal may be communicated to a receiving party's communications device without activating an alert (e.g., a ringer, a light, an odor, a vibrator, and other sensory indicators). That is, an alert of the receiving party's communications device may be disengaged, disabled, and/or overridden such that the device does not produce an alert of the Call Ticker Signal (and/or Call Ticker Message).

According to another embodiment, a third party sponsor (e.g., an advertiser, marketing company, family member) could provide a third party sponsored access address (e.g., an 600 number, IP address, etc.) that allows the receiving party to establish a communications connection with another party when the receiving party (and/or the other party) agrees to receive and/or interact with the sponsor's Call Ticker Signal during the voice connection of the receiving party and the other party. That is, the third party is billed for the communications connection of the receiving party and the other party. Thus, the receiving party is able to engage in free or reduced rate communications with the other party in exchange for viewing, listening, playing, and/or responding to the third party Call Ticker Message. Typically, the receiving party calls the third party sponsored access address, inputs the telephone number and/or communications address of the other party's communications device, inputs and/or confirms the communications address of the receiving party's communications device for the transmission of third party Call Ticker Signal and thereby agrees to receive and/or respond to the third party's Call Ticker Message. Thereafter, the third party communications sponsor establishes the communications connection via the communications network between the receiving party's communications device and the other party's communications device (similar to the connection established when the receiving party uses a calling card access number to place a long distance call to the other party). The third party sponsor then initiates transmission of the third party sponsored call ticker signal(s) to the receiving party's communications device (and/or the other party's communications device), and thus, the third party sponsor does not need to maintain a voice connection with either the receiving party's communications device nor the other party's communications device. Rather, the third party sponsor may elect to maintain an alternate communications connection such that the third party maintains a dynamic call ticker communications connection such that only the third party call ticker signal(s) is transmitted. Alternatively, after the communications connection between the receiving party and the other party, the third party is released from the communications connections, and, thereafter establishes a new communications connection each time the third party call ticker signal is transmitted to the receiving party and/or the other party (similar to communications of Caller ID Call Waiting signals that are sent when the receiving party and the other party are engaged in a voice connection). Finally, the third party sponsor may limit the duration of the phone conversation, such as, only agreeing to pay for a set period of time (e.g., 10 minutes), to pay for the communications connection so long as the receiving party continues to respond to third party call ticker messages, to pay for the communications connection if the other party also agrees to receive and respond to the third party call ticker messages, and/or other billing arrangements.

The telecommunications network 515 may include wired, optical, and/or wireless elements and may further include private network elements, such as private branch exchanges (PBXs), and/or other elements (not shown). The telecommunications network 515 includes Advanced Intelligent Network (AIN) componentry controlling many features of the network. The telecommunications network 515 and/or each of the switches 505, 635 could also include a packet-based "soft switch" that uses software control to provide voice, video, and/or data services by dynamically changing its connection data rates and protocols types. If the telecommunications network 515 and/or one of the switches 505, 635 should include a softswitch, the AIN componentry is replaced by an application server that interfaces with the softswitch via a packet protocol, such as Session Initiation Protocol (SIP). The means of communicating the Call Ticker Signal between or among the calling party's communications device 110, the Caller ID device 140, the receiving party's communications device 130, the switches 505, 635, the telecommunications network 515 including AIN componentry, the data network 560 including the gateway 620, and/or the Call Ticker Device 800 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 602 standards, and Digital Subscriber Lines (DSL) are just some examples of the transmission means. The signaling between these devices and/or networks, however, is well understood in by those of ordinary skill the art and will not be further described. Further, those of ordinary skill in the art will be able to apply the principles of this invention to their own network configurations which may differ substantially from the communications system(s) shown in the figures.

Figure 13:
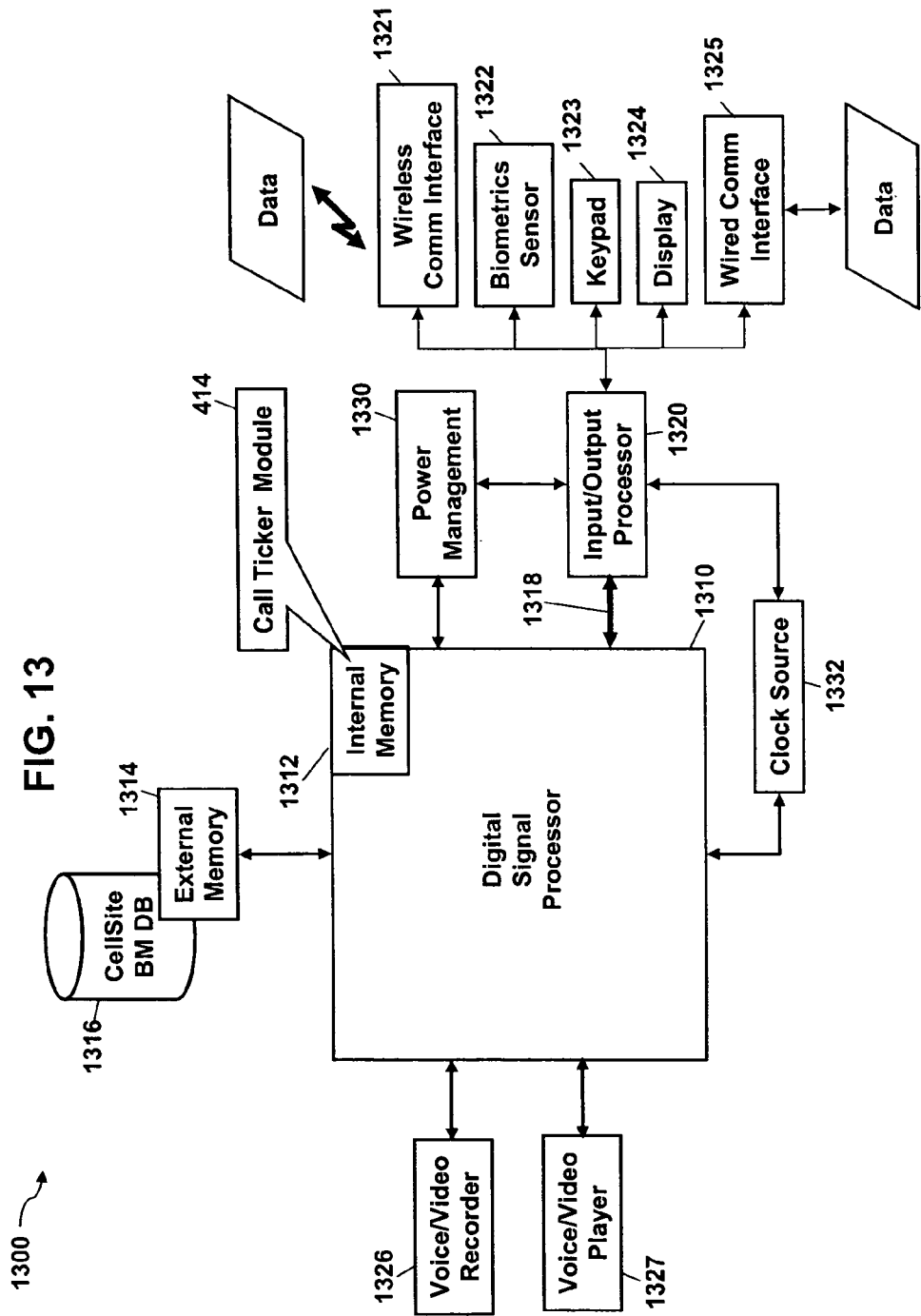
FIG. 13 is a block diagram of a Call Ticker Module residing in another computer system according to embodiments of this invention.

FIG. 13 is a block diagram of another communications device having the Call Ticker Module 414 according to alternate embodiments of this invention. The Call Ticker Module 414 operates within a memory device of a digital signal processor 1310 of a computer system 1300. The memory device could include internal memory 1312 of the digital signal processor 1310, or the memory device could include an external memory 1314 communicating with the digital signal processor 1310. The digital signal processor 1310 converts analog signals to digital signals and converts digital signals to analog signals. The digital signal processor 1310 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 1310 interfaces with an input/output processor 1316. The input/output processor 1316 controls system input/output and provides telephony and/or computer control features. A bus 1318 provides a signal communication path between the digital signal processor 1310 and the input/output processor 1316. The input/output processor 1316 is a microprocessor that includes memory (not shown), communication controllers (not shown), and peripheral controllers (not shown). The communication controllers, for example, could control packet-based communications with the connected communications device and a connected network through a wireless communications interface 1320 or through a wired communications interface 1328. The communication controllers could also control packet-based communications with a communications switch (not shown). The peripheral controllers provide an interface with an LCD/LED/CRT display 1326 and with telephony/computer-like control features, such as a keypad 1324. Additionally, the peripheral controllers provide an interface with a biometrics sensor 1322, such as, for example, a fingerprint ID device. The biometrics sensor 1322 may provide security features that prevent unauthorized users from exploiting the computer 1300. The biometrics sensor 1322 could also comprise retina recognition device and software, DNA/RNA recognition device and software, facial recognition device and software, speech recognition device and software, and/or scent recognition device and software.

The digital signal processor 1310 also interfaces with an external voice/video player system 1336 and/or with a voice/video recorder system 1338 to audibly and/or visually communicate data. Further, a clock source 1332 provides a system clock for the computer 1300, and the clock source 1332 may also include higher and lower frequency multiples of the system clock depending upon power requirements and power availability. Still further, a power management system 1330 provides differing power control mechanisms, such as a sleep mode and a low-power mode, to efficiently utilize available power and to reduce thermal management concerns.

Figure 14:
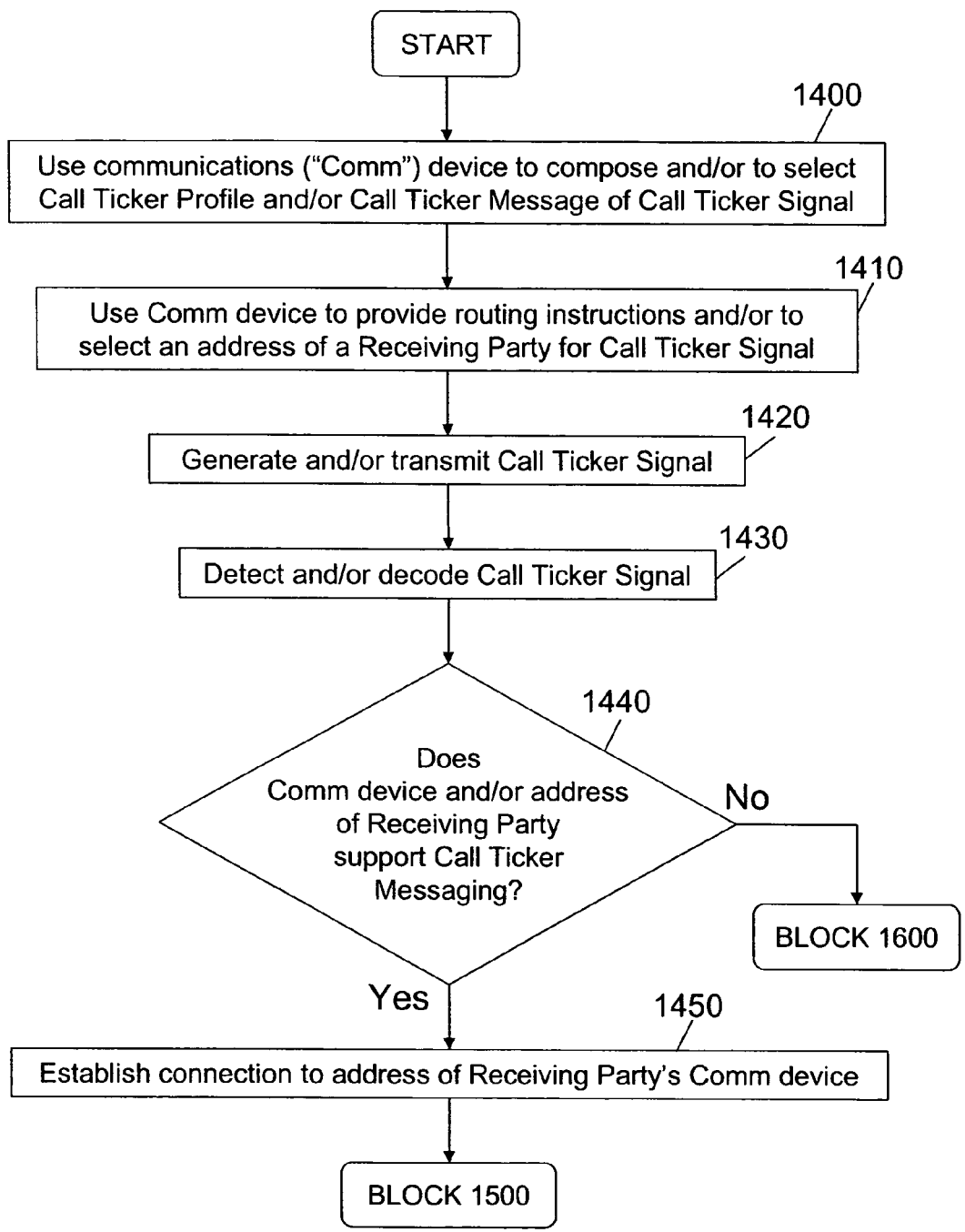
FIGS. 14-16 are flowcharts illustrating Call Ticker communications methods according to embodiments of this invention.
Figure 15:
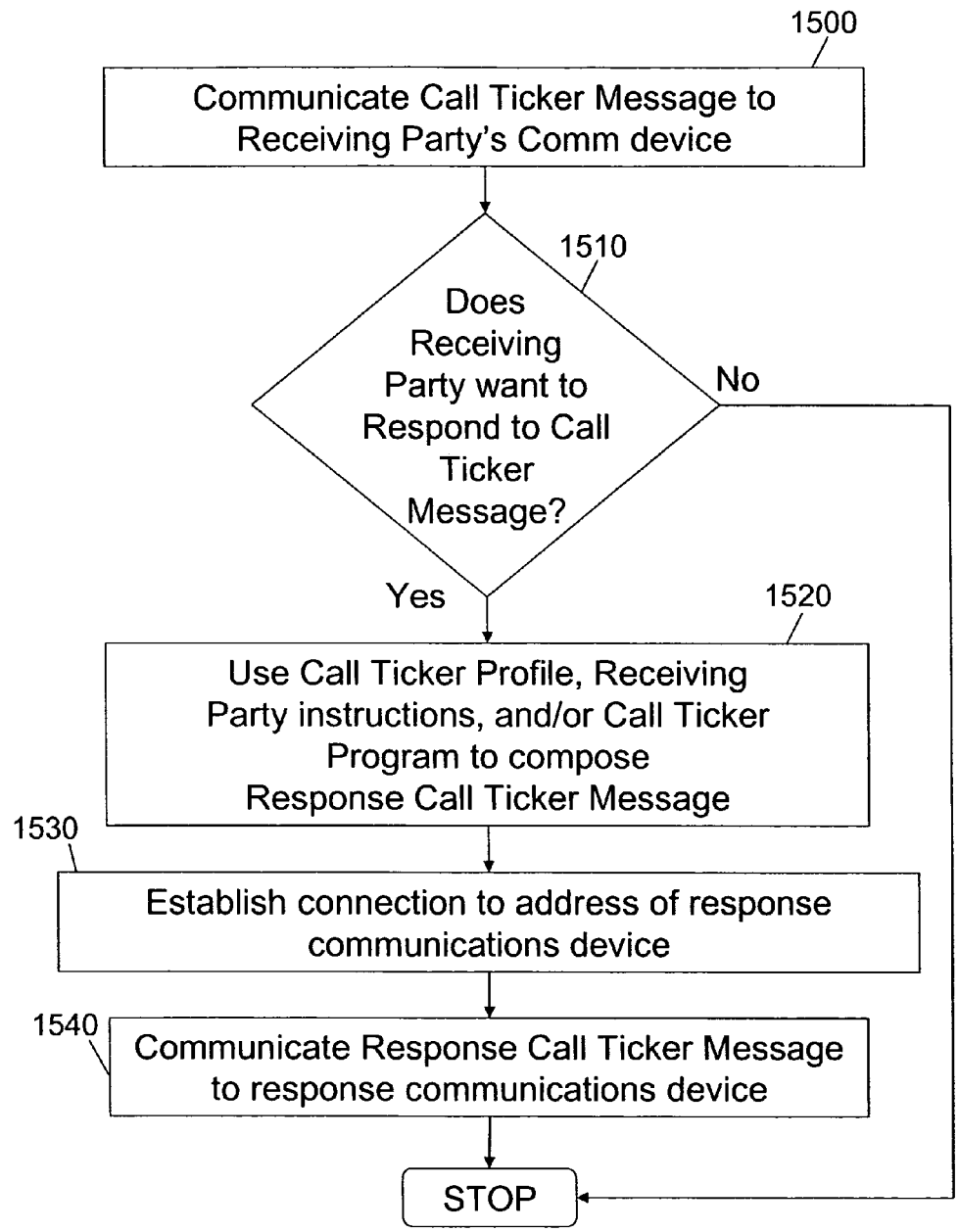
Figure 16:
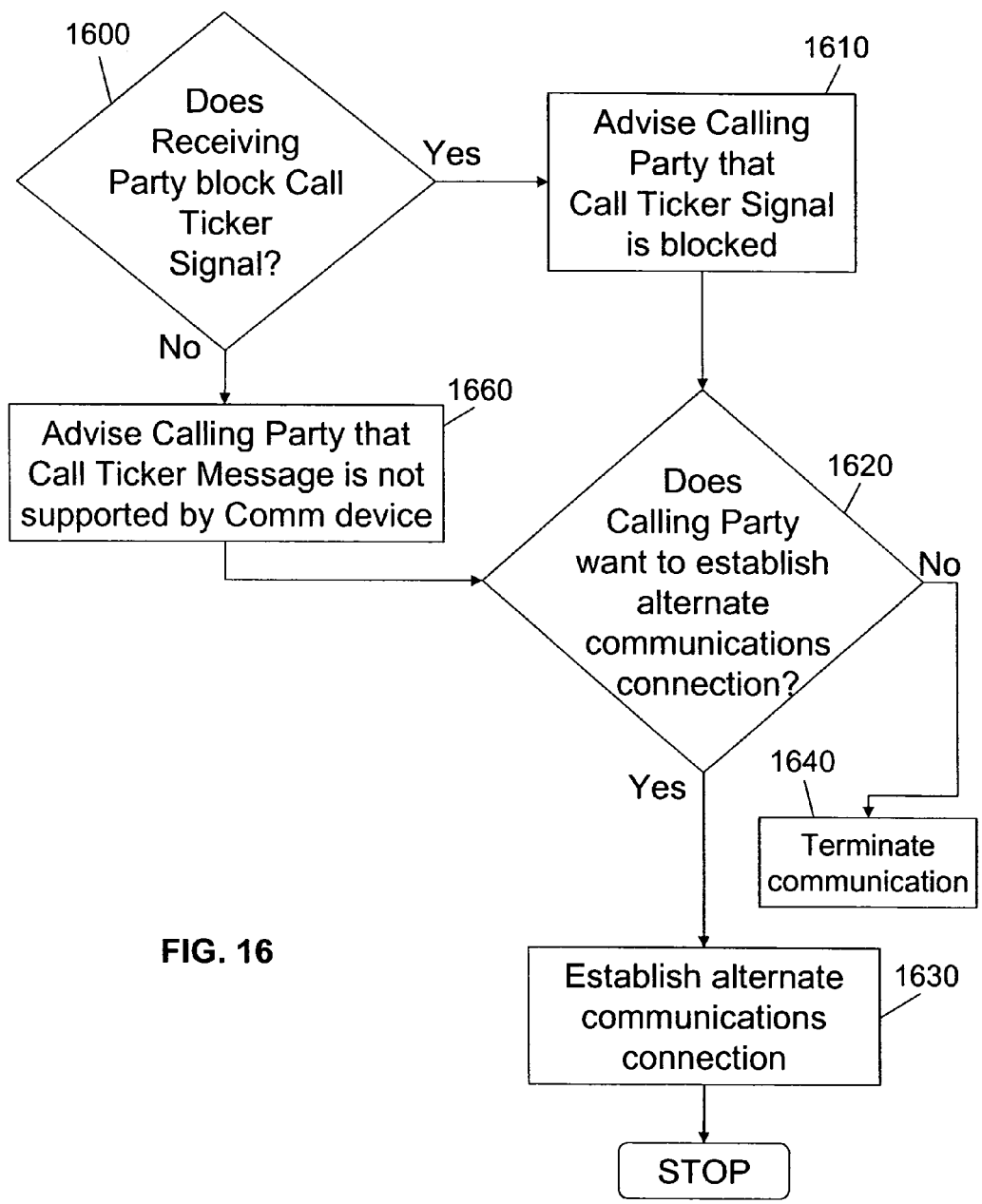

FIGS. 14-16 are flowcharts showing processes of providing the Call Ticker Services according to embodiments of this invention. While the processes in FIGS. 14-16 are shown in series, these processes may occur in different orders and/or at simultaneous times as one of ordinary skill in the art will understand.

A user use a communications device to compose and/or to select a Call Ticker Profile and/or a Call Ticker Message [block 1400] and to input and/or select a destinations communications address (and/or a receiving party that has an associated destinations communications address of the receiving party's communications device) [block 1410] for a Call Ticker Signal having the Call Ticker Message. Thereafter, the communications device and/or communications network(s) generates and transmits the Call Ticker Signal [block 1420]. The communications network detects and decodes the Call Ticker Signal 1430 and determines if the communications device and/or the communications address supports Call Ticker Messaging (e.g., authorization to supplant an ICLID signal, presentation capabilities of the receiving party's communications device, such as whether the receiving party's communications device includes componentry to present two lines of text, each line with fifteen characters, and so on) [block 1440]. If yes, then the communications network establishes a connection (or alternatively sends a data burst of the Call Ticker Signal) [block 1450] and communicates the Call Ticker Signal to the receiving party communications device [block 1500]. After the Call Ticker Message is presented by the receiving party communication device (including a Call Ticker Message Device), the receiving party decides whether to respond to Call Ticker Message [block 1510]. If yes, then the receiving party uses a Call Ticker Profile, the Call Ticker program of the receiving party's communications device and/or the receiving party's Call Ticker Device, and/or instructions from the receiving party to prepare the response Call Ticker Message [block 1520]. The response Call Ticker Message is transmitted with a response Call Ticker Signal via the communications network(s), and the communications network(s) establishes a connection to the response communications address [block 1530] and communicates the response Call Ticker Signal [block 1540]. Alternatively, the communications network may use an established connection (such as when the receiving party and another party are engaged in a voice connection when the response Call Ticker Signal is sent) to transmit the response Call Ticker Signal. If the receiving party does not want to transmit a response Call Ticker Message, then the Call Ticker Messaging ends. Although not shown, the receiving party could also elect to forward the Call Ticker Signal to a third party.

Referring back to "Block 1440," if the communications device does not support Call Ticker Messaging, then the communications network determines whether the receiving party (and/or receiving party's communications device) blocks or does not accept transmission of the Call Ticker Signal [block 1600]. If yes, then the communications network advises the calling party (e.g., the party associated with the originating communications address) that the receiving party does not accept transmission of the Call Ticker Signal [block 1610] and determines whether the calling party wants to establish an alternate communication connection such as a voice connection (if the Call Ticker Signal is just transmitted as a data burst) [block 1620]. If yes, then the communications network establishes the alternate communications connection [block 1630]. However, if the calling party does not want to establish alternate communications, then the communication is terminated [block 1640]. Referring back to "Block 1600," if the receiving party and/or the receiving party's communications device does not block Call Ticker, then the communications network advises the calling party that the communications device does not support and/or cannot present the Call Ticker Message [block 1660] and determines whether the calling party wants to establish an alternate communication connection such as a voice connection (if the Call Ticker Signal is just transmitted as a data burst) [block 1620]. If yes, then the communications network establishes the alternate communications connection [block 1630]. However, if the calling party does not want to establish alternate communications, then the communication is terminated [block 1640].

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) don't have to purchase an expensive SSP and/or SCP to process telephone calls. This next-generation packet network represents an alternative operating environment for the Call Ticker systems, methods, programs, and apparatuses. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic communications network) to interoperate. Accordingly, this invention is intended to include those other variations, modifications, and alternate embodiments that adhere to the spirit and scope of this invention.

What is claimed is:

1. A method, comprising:
   accessing a profile storing information for generating a message;
   at a time indicated in the profile, generating the message;
   retrieving a voice communications address and another voice communications address from the profile;
   routing the message to a destination Internet Protocol address; and
   when an off-hook condition is detected at the voice communications address within a pre-selected time period from the routing of the message, then automatically establishing a voice connection between the voice communications address and the another voice communications address.

2. The method of claim 1, wherein when the off-hook condition is not detected within the pre-selected time period, then declining to automatically establish the voice connection.

3. The method of claim 1, further comprising retrieving a stock symbol from the profile.

4. The method of claim 3, further comprising retrieving an origination address from the profile, the origination address indicating from where a stock quote may be obtained for the stock symbol.

5. The method of claim 4, further comprising querying the origination address to obtain the stock quote.

6. The method of claim 5, further comprising including the stock quote in the message routed to the destination address.

7. The method of claim 4, further comprising calling the origination address to obtain the stock quote.

8. The method of claim 1, further comprising retrieving a parameter from the profile that describes an alert that accompanies the message.

9. The method of claim 1, further comprising retrieving a day of a week from the profile for generating the message.

10. The method of claim 1, further comprising retrieving from the profile information describing an amount of owned shares.

11. A computer program product comprising a computer readable medium storing processor executable instructions for performing a method, the method comprising:
    accessing a profile storing information for generating a message;
    at a time indicated in the profile, generating the message;

retrieving a voice communications address and another voice communications address from the profile;

routing the message to a destination Internet Protocol address; and when an off-hook condition is detected at the voice communications address within a pre-selected time period from the routing of the message, then automatically establishing a voice connection between the voice communications address and the another voice communications address.

12. A system, operative to:

access a profile storing information for generating a message;

at a time indicated in the profile, generate the message;

retrieve a voice communications address and another voice communications address from the profile;

route the message to a destination Internet Protocol address; and when an off-hook condition is detected at the voice communications address within a pre-selected time period from the routing of the message, then automatically establish a voice connection between the voice communications address and the another voice communications address.

13. The system of claim 12, further comprising operative to:

retrieve a stock symbol from the profile;

retrieve an origination address from the profile, the origination address indicating from where a stock quote may be obtained for the stock symbol;

query the origination address to obtain the stock quote; and include the stock quote in the message routed to the destination address.

14. A method, comprising:

storing in a profile a subscriber's telephone number and a stock broker's telephone number;

generating an incoming calling line identification signal comprising a stock quote;

transmitting the incoming calling line identification signal to a destination Internet Protocol address associated with the subscriber's telephone number;

if an off-hook condition is detected at the subscriber's telephone number within a pre-selected time period from the transmission of the stock quote, then retrieving the stock broker's telephone number and automatically establishing a call between the subscriber's telephone number and the stock broker's telephone number; and if the off-hook condition is not detected within the pre-selected time period, then declining to automatically establish the call.

15. The method of claim 14, further comprising retrieving from the profile an amount of shares owned by the subscriber.

16. The system of claim 12, further operative to retrieve a parameter from the profile that describes an alert that accompanies the message.

17. The system of claim 13, further operative to call the origination address to obtain the stock quote.

18. A system, operative to:

receive an incoming calling line identification signal comprising a stock quote at destination Internet Protocol address associated with a telephone number;

if an off-hook condition is detected at the telephone number within a pre-selected time period from the receipt of the stock quote, then retrieve another telephone number and automatically establish a call between the telephone number and the another telephone number; and if the off-hook condition is not detected within the pre-selected time period, then decline to automatically establish the call.

19. The system of claim 18, further operative to retrieve an amount of shares owned.

20. The system of claim 18, further operative to prioritize receipt of the stock quote over receipt of an incoming caller identification signal.

* * * * *